United States Patent
Hiraiwa et al.

(10) Patent No.: US 6,445,759 B1
(45) Date of Patent: Sep. 3, 2002

(54) FUEL ASSEMBLY AND NUCLEAR REACTOR

(75) Inventors: Kouji Hiraiwa; Yamato Hayashi; Yasushi Hirano; Jun Saeki, all of Kanagawa-ken; Kazuki Hida, Tokyo; Junko Watanabe, Kanagawa-ken, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/689,789

(22) Filed: Oct. 13, 2000

(30) Foreign Application Priority Data

Oct. 14, 1999 (JP) .............................. 11-292471
Oct. 10, 2000 (JP) ........................ 2000-309899

(51) Int. Cl.$^7$ ................................. G21C 3/00
(52) U.S. Cl. ..................... 376/419; 376/435; 376/428
(58) Field of Search ................. 376/419, 435, 376/428

(56) References Cited

U.S. PATENT DOCUMENTS

| | | | |
|---|---|---|---|
| 4,587,090 A | | 5/1986 | Mochida et al. |
| 4,629,599 A | * | 12/1986 | Crowther et al. ........... 376/212 |
| 5,089,210 A | * | 2/1992 | Reese et al. ................. 376/212 |
| 5,388,132 A | | 2/1995 | Aoyama et al. |
| 5,524,033 A | * | 6/1996 | Hida et al. .................. 376/419 |

FOREIGN PATENT DOCUMENTS

| | | |
|---|---|---|
| DE | 33 08 956 | 9/1983 |
| DE | 40 14 861 | 12/1990 |
| EP | 0 315 929 | 5/1989 |
| EP | 0 532 858 | 3/1993 |
| EP | 0 664 546 | 7/1995 |
| FR | 2 705 491 | 11/1994 |
| JP | 55-132991 | 10/1980 |
| JP | 58-140673 | 8/1983 |
| JP | 5-8398 | 2/1993 |
| JP | 5-008398 | 2/1993 |
| JP | 6-331765 | 12/1994 |

* cited by examiner

Primary Examiner—Harvey E. Behrend
Assistant Examiner—R. Palabrica
(74) Attorney, Agent, or Firm—Oblon, Spivak, McClelland, Maier & Neustadt, P.C.

(57) ABSTRACT

A fuel assembly comprises a plurality of fuel rods bundled in grid pattern, a part of the fuel rods containing gadolinium as a burnable poison. At least one of the fuel rod having gadolinium contains gadolinium enriched in at least one kind of isotope of odd mass number more than an isotopic abundance of natural gadolinium. In the enriched gadolinium, a ratio of a content of Gd-155 to that of Gd-157 is 0.1 or less. An average concentration (wt %) $G0$ of enriched gadolinia is, with M denoting the number of month under rated power operation per one cycle of an equilibrium core, P power density of a nuclear reactor (kw/l unit) and W a sum of isotopic composition, is set in the range shown by the following expression.

$$G0 < 0.25 \cdot P \cdot M / W.$$

Thereby, in the fuel assembly, residual reactivity of a burnable poison at a cycle end can be decreased and thermal performance can be improved.

In another aspect of the fuel assembly, a gadolinia fuel rod disposed in a region on a control rod side contains gadolinium enriched in an isotope of odd mass number more than natural isotopic abundance. A concentration of enriched gadolinia is set at for instance one half or less that of natural gadolinia. Thus, enrichment of fissile material (uranium) in the gadolinia fuel rods can be larger than that in the existing fuel assembly, uranium enrichment averaged over a bundle being increased.

4 Claims, 19 Drawing Sheets

GADOLINIA CONCENTRATION (wt%)

GADOLINIA CONCENTRATION (wt%)

FIG. 16

| 4 | 3 | 2 | 1 | 1 | 1 | 2 | 3 | 4 |
|---|---|---|---|---|---|---|---|---|
| 3 | 1 | G1 | G1 | 1 | G1 | G1 | 1 | 3 |
| 2 | G1 | 1 | 1 | 1 | 1 | 1 | G1 | 2 |
| 1 | G1 | 1 | 1 |   |   | 1 | G1 | 1 |
| 1 | 1 | 1 |   | (WR) |   | 1 | 1 | 1 |
| 1 | G1 | 1 |   | (WR) | 1 | 1 | G1 | 1 |
| 2 | G1 | 1 | 1 | 1 | 1 | 1 | G1 | 2 |
| 3 | 1 | G1 | G1 | 1 | G1 | G1 | 1 | 3 |
| 4 | 3 | 2 | 1 | 1 | 1 | 2 | 3 | 4 |

Labels: 11, 12, 13, 14

FIG. 17

| 4 | 3 | 2 | 1 | 1 | 1 | 2 | 3 | 4 |
|---|---|---|---|---|---|---|---|---|
| 3 | 1 | G2 | G1 | 1 | G1 | G2 | 1 | 3 |
| 2 | G2 | 1 | 1 | 1 | 1 | 1 | G2 | 2 |
| 1 | G1 | 1 | 1 |   |   | 1 | G1 | 1 |
| 1 | 1 | 1 |   | (WR) |   | 1 | 1 | 1 |
| 1 | G1 | 1 |   | (WR) | 1 | 1 | G1 | 1 |
| 2 | G2 | 1 | 1 | 1 | 1 | 1 | G2 | 2 |
| 3 | 1 | G2 | G1 | 1 | G1 | G2 | 1 | 3 |
| 4 | 3 | 2 | 1 | 1 | 1 | 2 | 3 | 4 |

Labels: 11, 12, 13, 14

FUEL ROD TYPE    1    2    3    4    5    G1    G2    G3

FUEL ASSEMBLY AND NUCLEAR REACTOR

BACKGROUND OF THE INVENTION

1. Field of the Invention

The present invention relates to a fuel assembly having fuel rods containing gadolinium as a burnable poison, and nuclear reactor. In particular, the present invention relates to a fuel assembly and nuclear reactor in which, without damaging thermal margin of the fuel rods, fuel economy is improved.

2. Description of Related Art

In a light-water type power reactor in which uranium or uranium dioxide is used as a nuclear fuel material, a fuel assembly is set at a necessary initial uranium enrichment, with the progress of burnup an excess reactivity of the reactor being decreased. From a viewpoint of safety, for the excess reactivity not to be too large, a material called a burnable poison of which negative reactivity decreases with the burnup is added to the fuel. Mainly in a boiling water reactor (BWR) and sometimes in a pressurized water reactor (PWR), gadolinium of atomic number 64 is used as the burnable poison, the gadolinium being added in the form of gadolinia that is an oxide of gadolinium to the nuclear fuel material.

A sectional structure of an existing fuel assembly is shown in FIG. 19.

In the fuel assembly 21, fuel rods 22 and 23 in which the nuclear fuel material such as uranium or the like is enclosed are arranged in a square grid pattern, for instance. A water rod 24 through the inside of which non-boiling cooling water flows during output operation is disposed in the neighborhood of the center. Furthermore, an entirety thereof is accommodated in a channel box 25. In the figure, reference numeral 22 denotes a fuel rod that does not contain gadolinia, reference numeral 23 denoting a fuel rod (hereinafter referred to as gadolinia fuel rod) that contains gadolinia, respectively.

Usually, for four sets of fuel assemblies 21 each, one set of control rod 26 is disposed to constitute a reactor core. Inside the control rod 26, a plurality of poison rods 27 in which a neutron absorber is enclosed are regularly arranged to be accommodated. A length, a number of pieces, a shape and an arrangement of the fuel rods 22 and 23, and an existence, a number of pieces, a shape, an arrangement or the like of the water rod in the fuel assembly are different according to nuclear reactors. The structure of an existing fuel assembly is not restricted to the fuel assembly shown in FIG. 19.

FIG. 20 is a sectional view in a vertical direction (axial direction) showing a structure of a fuel rod. In the fuel rods 22 and 23, at the uppermost portion of a body in which fuel pellets 28 are regularly piled up, a plenum spring 29 is disposed to suppress a displacement of the pellets, the entirety being accommodated in a shield tube 30. Lower and upper end plugs 31 and 32 seal lower and upper portions of the shield tube 30 respectively, inside of the shield tube 30 helium gas being enclosed under an appropriate pressure.

For the fuel rods, according to the position inside the fuel assembly, enrichment of fissile material and concentration (content) of gadolinia are determined.

FIG. 21A is a transversal sectional view showing an arrangement of the fuel rods when the control rod 26 is disposed in the upper left position. Reference marks 1, 2, 3, 4 and 5 denote the fuel rods 22 that do not contain gadolinia, G1, G2 and G3 denoting gadolinia fuel rods 23, respectively. WR denotes the water rod 24.

FIG. 21B is a diagram showing, in a vertical direction (axial direction) of the fuel rods (1, 2, 3, 4, 5, G1, G2 and G3), enrichment distributions of the fissile material (uranium for instance) and concentration distributions of gadolinia. In the figure, there are used the enrichments of uranium of A to G, and the gadolinia concentrations (additional ratio) of a to c. The gadolinia fuel rods 23 contain uniformly in the axial direction uranium of the enrichment of, for instance, B (the enrichment C is also satisfactory). Only the gadolinia concentrations are shown in FIG. 21B.

The uranium enrichments decrease in the order of A>B>C>D>E>F>G, G being the enrichment of natural uranium. In the fuel rod 22 that does contain no gadolinia, there are disposed at the upper and lower ends the portions (natural uranium blankets) that contain only the natural uranium. There may be cases where the uranium enrichments have a difference in the axial direction.

The gadolinia fuel rods 23, though usually disposed at the positions other than that of the outermost periphery of the fuel assembly, may be disposed at the positions of the outermost periphery. The gadolinia concentrations are in the decreasing order of a>b>c, a difference being given in some cases in the axial direction. Furthermore, whereas there are cases where the natural uranium blankets are disposed at the upper and lower ends, without the natural uranium blanket there may be disposed gas reservoirs that are called plenum space at the upper and lower ends.

Another existing arrangement of the fuel rods in the fuel assembly 21 is shown in FIG. 22.

FIG. 22A is a transversal sectional view showing an arrangement of the fuel rods when the control rod 26 is located in the upper left position. Reference marks 1, 2, 3, 4, 5, 6 and V1 and V2 denote the fuel rods 22 that contain no gadolinia, G1, G2 and G3 denoting the gadolinia fuel rod 23. The fuel rods designated by reference marks 1, 2, 3, 4, 5, 6, and G1, G2 and G3 are long-length fuel rods, the fuel rods designated by the reference marks V1 and V2 being short-length fuel rods shorter than the long-length fuel rods in fuel effective portion. WR denotes the water rod 24.

FIG. 22B is a diagram showing, in the vertical direction (axial direction) of the fuel rods (1, 2, 3, 4, 5, 6, V1, V2, G1, G2 and G3), enrichment distributions of the fissile material (uranium for instance) and concentration distributions of gadolinia.

In the figure, there are used the uranium enrichments of from A to G and the gadolinia concentrations of from a to c. The uranium enrichments are in the decreasing order of A>B>C>D>E>F>G, G being the enrichment of the natural uranium. In the long-length fuel rods, there may be disposed the portions that contain only the natural uranium at the upper and lower ends. Further, in the axial direction, the uranium enrichments may be differentiated. Though the gadolinia fuel rods 23 are usually disposed in the positions other than the outermost periphery of the fuel assembly, those may be disposed in the positions of the outermost periphery. The gadolinia concentrations are in the decreasing order of a>b>c, the concentrations being differentiated in the axial direction in some cases.

The fuel assembly shown in FIGS. 22A and 22B is designed to be suitable for the following fuel grid pattern (hereinafter referred as D lattice). That is, in the D lattice, a width of the non-boiling water region between outer walls of the channel boxes of the adjacent fuel assemblies is configured to be larger in a control rod insertion side than in the opposite side (non-insertion side). The fuel assembly is loaded with a different spacing from adjacent fuel assemblies in the reactor core comprising D lattice.

In the D lattice, the control rod insertion side, being larger in thermal neutron flux distribution in comparison with the non-insertion side, is likely to be high in local power. Accordingly, when a transversal cross-section of the fuel assembly is divided into two regions of a control rod side and an opposite-control rod side, in the fuel rods disposed in the region of the control rod side, in comparison with the fuel rods disposed in the region of the opposite-control rod side, the enrichment of the fissile material (uranium) is lowered. For instance, in the fuel rods 22 containing no gadolinia that are disposed at the outermost periphery on the opposite-control rod side, the uranium enrichment is set at the highest value of A. Whereas, those of the fuel rods 22 containing no gadolinia that are disposed in the region on the control rod side are set at B, C and D, all lower than A. Furthermore, also in the gadolinia fuel rods 23, the uranium enrichments of those disposed in the region of the opposite-control rod side are set at the most highest value of A. Whereas, in the gadolinia fuel rods on the control rod side, the uranium enrichments are set at B and C lower than A. The uranium enrichment averaged over the fuel assembly (bundle) is set at 3.96 wt %.

Now, in the existing fuel assemblies shown in FIGS. 21 and 22, respectively, natural gadolinium is used as the burnable poison, the natural gadolinia that is an oxide of the natural gadolinium being added to the nuclear fuel material. That is, the natural gadolinium is a mixture of six kinds of isotopes of which mass numbers are 154, 155, 156, 157, 158 and 160, the content ratios (isotopic composition) of the respective isotopes being 2.1 wt %, 14.5 wt %, 20.3 wt %, 15.7 wt %, 25.0 wt % and 22.5 wt %. Among these, gadolinium of mass number 157 (Gd-157) has the largest thermal neutron absorption cross section in all nuclides, gadolinium of the mass number of 155 (Gd-155) having such a large thermal neutron absorption cross section as approximately one fourth that of Gd-157. Furthermore, the thermal neutron absorption cross sections of Gd-156 and Gd-158 generated due to absorption of the neutron by Gd-155 and Gd-157 are approximately one several tens thousandth those of Gd-155 and Gd-157.

Thus, when the neutron absorption cross section of its own is large and that of a daughter isotope generated due to the absorption of the neutrons is small, due to the neutron absorption (burnup) the absorption cross section decreases largely, the isotopes being applicable as the burnable poison. The total content of Gd-157 and Gd-155 in the natural gadolinium is approximately 30 wt %.

The addition amount of gadolinia is set so that, in addition to appropriately suppressing the excess reactivity, the negative reactivity due to the burnable poison continues up to a cycle end. Furthermore, in addition to the above, the addition amount of gadolinia is set so that the poison reactivity remains at the cycle end to make unnecessary to increase the enrichment of the fissile material. According to the number of operation month per cycle, power density or the like, the concentration of gadolinia needs to be controlled.

In the existing fuel assembly, as shown in the following, there is a problem of residual reactivity due to Gd-155, Gd-157 or the like at equilibrium concentrations. That is, the gadolinia concentration is set so that at the cycle end, the poison reactivity does not remain. However, relatively high contents of Gd-154, Gd-156 or the like are contained in the natural gadolinium, and Gd-155 and Gd-157 generated due to the neutron absorption of Gd-154 and Gd-156 exist in equilibrium concentrations. Accordingly, there remains the poison reactivity due to Gd-155 and Gd-157 at the cycle end,.

Furthermore, in the gadolinia fuel rods, uranium oxide or the like, which is the nuclear fuel material, and gadolinia are mixed to form a solid solution. Accordingly, thermal conductivity thereof is lower than that of uranium oxide alone. In particular, the higher the concentration of gadolinia is, the larger the degree of decrease of thermal conductivity is. When the thermal conductivity decreases, even if a linear power density (thermal power per unit length of the fuel rod) is equal, temperature of the fuel rod goes up to be likely to adversely affect on the performance of the shield tube. In order to avoid these problems, in the existing fuel assembly, the enrichment of the fissile material such as uranium in the gadolinia fuel rod is made lower than that of the fuel rod that contain no gadolinia to lower the power. Thereby, care is taken so that the temperature of the fuel rod does not go up excessively.

On the other hand, for the uranium enrichment, from the restriction on critical safety during manufacture and transport, the maximum value is determined. Since the uranium enrichment of the gadolinia fuel rod is restricted, there occurs a problem that the uranium enrichment averaged over the entire fuel assembly cannot be sufficiently increased. Such problems accompanying the use of gadolinia become particularly conspicuous in an initial loading core of which gadolinia concentration is large and a core of a longer operation time period.

Furthermore, when disposing the gadolinia fuel rods in the following positions, the uranium enrichment is necessary to be low.

(1). A region on a control rod insertion side in the D lattice.

(2). Positions of four corners of the fuel bundle disposed in a second position inwardly from the outermost periphery.

(3). Positions adjacent to the short-length fuel rods.

(4). Positions of the outermost periphery, in particular of four corners thereof.

That is, in the D lattice, the region on the control rod insertion side is larger in the thermal neutron flux distribution than the region on the non-insertion side is, the local power tending to be higher. Furthermore, in the aforementioned general design, the gadolinia fuel rods are disposed in the positions other than the outermost periphery. However, the fuel rods positioned at the four corners of the fuel rods group in the second position inwardly from the outermost periphery tend to be the highest in power.

Furthermore, in the fuel assembly constituted of the long-length fuel rods and the short-length fuel rods of which fuel effective portions are shorter than that of the long-length one, a moderator exists in the place of the nuclear fuel material in the shorter portion of the short-length fuel rod. Accordingly, the power of the fuel rods adjacent thereto tends to become high.

Thus, in the gadolinia fuel rods disposed in the positions shown in the aforementioned (1) to (4), since the power tends to become high, the uranium enrichment is necessary to be lowered in comparison with the fuel rods disposed in the other positions.

However, in recent years, from a viewpoint of an improvement in fuel economy or the like, a higher burnup of the reactor core is aimed and the uranium enrichment averaged over the fuel assembly is demanded to be further higher. In the D lattice in particular, the neutron flux distribution in a diameter direction and the enrichment distribution do not coincide to be poor in fuel economy. Accordingly, there is a latent necessity in improving the enrichment. In spite of these, from the restriction on critical safety of a fuel manufacturing plant or the like, there is a restriction on the uranium enrichment applicable to the fuel pellet, that is, the maximum of 4.9 wt %. Accordingly, in the fuel assembly for higher burnup, to further increase the uranium average enrichment, it is necessary to increase the enrichment of uranium contained in the gadolinia fuel rods.

Still further, in recent years, in order to effectively use plutonium produced by conversion of uranium, a fuel assembly loaded with uranium/plutonium mixed-oxide fuel (MOX fuel) in which plutonium obtained by reprocessing spent fuel is enriched is disclosed.

SUMMARY OF THE INVENTION

The present invention was carried out to solve these problems. An object of the present invention is to provide a fuel assembly and a nuclear reactor. The fuel assembly is capable of reducing a residual reactivity of a poison at the cycle end and further capable of sufficiently increasing an enrichment of a fissile material. The nuclear reactor is provided with such fuel assembly and improved in the thermal margin. Furthermore, another object of the present invention is to provide a fuel assembly and nuclear reactor in which without damaging thermal margin of the gadolinia fuel rods, a bundle-averaged enrichment of a fissile material is increased to result in an improvement of fuel economy.

A first aspect of the present invention is a fuel assembly comprising a plurality of fuel rods bundled in grid pattern, a part of the fuel rods containing gadolinium as a burnable poison, wherein at least one of the fuel rods having gadolinium contains gadolinium enriched in at least one kind of isotope of odd mass number more than an isotopic abundance of natural gadolinium, and in the enriched gadolinium, a ratio of a content of gadolinium of mass number of 155 to that of gadolinium of mass number of 157 is 0.1 or less.

In the present fuel assembly, the fuel rods comprising gadolinium in which the isotope of mass number 157 alone is enriched more than an isotopic abundance in the natural gadolinium may be used. Alternatively, the fuel rods comprising gadolinium in which gadolinium isotopes of mass numbers 157 and 155 are enriched respectively may be used. By making the ratio of a content (wt %) of gadolinium of mass number 155 to that of gadolinium of mass number 157 0.1 or less, performance of the fuel assembly can be improved.

A second aspect of the present invention is a fuel assembly comprising a plurality of fuel rods that are bundled in grid pattern and contain enriched uranium as a nuclear fuel material. A part of the fuel rods contains gadolinium as a burnable poison. At least one of the fuel rods having gadolinium contains the gadolinium in which at least one kind of isotopes of odd mass number is enriched more than the isotopic abundance of natural gadolinium. A concentration (wt %) $G0$ of an oxide of the enriched gadolinium averaged over the entire fuel rods having the gadolinium is set in the range shown by the following expression.

$$G < 0.25 \cdot P \cdot M / W$$

In the above expression, M denotes the number of month per one cycle under rated power operation of an equilibrium reactor core, P denoting a power density (kw/l unit) of the nuclear reactor, W denoting a sum of the isotopic composition (% unit) of the enriched gadoliniums of odd mass number, respectively.

The aforementioned expression ($G<0.25 \cdot P \cdot M/W$) restricts an average concentration of enriched gadolinia that is an oxide of the enriched gadolinium. The above expression is obtained by varying respectively the isotopic composition (weight ratio) of gadolinium isotopes (Gd-155 and Gd-157) of odd mass number and the gadolinia concentration to evaluate. The upper limit of an appropriate average gadolinia concentration is proportional to the number of operation month M and the power density P, respectively, being inversely proportional to the sum of the compositions of the isotopes of Gd-155 and Gd-157. A factor 0.25 that is a proportional constant is obtained by repeating evaluations.

Thus, in the fuel assembly in which gadolinium isotopes of odd mass number are enriched, when the gadolinia average concentration $G0$ satisfies the above expression, the residual reactivity of gadolinia at the operation cycle end can be made the minimum and the excess reactivity can be appropriately suppressed.

In the above expression ($G<0.25 \cdot P \cdot M/W$) setting an appropriate range of the gadolinia concentration, uranium is assumed as a fissile material. Even in the case where a fuel of mixed oxide (MOX fuel) of uranium and plutonium is used, the gadolinia enriched in the gadolinium isotopes of odd mass number can be applied. In the fuel assembly where the MOX fuel is used, the gadolinia average concentration can be set at one half the gadolinia average concentration in the fuel assembly where uranium is used.

That is, the fuel assembly comprises a plurality of fuel rods that are bundled in grid pattern and contain mixed oxide of uranium and plutonium as a fissile material. A part of the fuel rods contains gadolinium as the burnable poison. Here, at least one of the fuel rods having gadolinium contains the gadolinium in which at least one kind of isotopes of odd mass number is enriched more than the isotopic abundance in natural gadolinium. Furthermore, the concentration (wt %) $G0$ of an oxide of the enriched gadolinium, averaged over the entire fuel rods having the aforementioned gadolinium is set in the range shown by the following expression.

$$G < 0.15 \cdot P \cdot M / W$$

In the expression, a factor 0.15 is obtained by repeating evaluations with the fuel assembly that uses the MOX fuel.

Further, in an initial loading core where uranium is used as the fissile materials the reactivity of gadolinia needs to be maintained for two cycles. In that case, the upper limit of the gadolinia average concentration can be set at two times that at the equilibrium core having uranium.

That is, a third aspect of the present invention is a fuel assembly comprising a plurality of fuel rods bundled in grid pattern and containing enriched uranium as the nuclear fuel material. A part of the fuel rods contains gadolinium as the burnable poison. Here, at least one piece of the fuel rods containing gadolinium contains the gadolinium in which at least one kind of isotopes of odd mass number is enriched more than the isotopic abundance of natural gadolinium. Furthermore, the concentration (wt %) $G0$ of an oxide of the enriched gadolinium averaged over the entire fuel rods having the aforementioned gadolinium is set in the range shown by the following expression.

$$G < 0.5 \cdot P \cdot N / W$$

In the above expression, N denotes the number of month per one cycle under the rated power operation of the initial loading reactor core, P denoting the power density (kw/l unit) of the nuclear reactor, W denoting a sum of the isotopic composition (% unit) of the enriched gadoliniums of odd mass number, respectively.

In the fuel assembly of the present invention, the fuel rod containing the oxide (enriched gadolinia) of the enriched gadolinium can have a plurality of segments different in the enriched gadolinia concentration. The gadolinia fuel rod having such plurality of segments of different enriched gadolinia concentrations may have a boundary portion in which a difference of the gadolinia concentrations between adjacent segments is in the range of 0.5 wt % or more, preferable to 0.5 wt %~1.0 wt %.

Furthermore, the fuel rod containing the enriched gadolinia may comprise a plurality of segments of different gadolinia concentrations and an intermediate segment having a gadolinia concentration lower by 1.0 wt % or more in comparison with the adjacent two segments. Here, a length of the intermediate segment can be set at one twenty-fourth or less the effective length of the gadolinia fuel rod.

In addition, in the gadolinia fuel rod having a plurality of segments of different enriched gadolinia concentrations, the gadolinia concentration of the lowermost segment may be made the largest.

In the present fuel assembly, the fuel rod that contains no gadolinia and the gadolinia fuel rod containing enriched gadolinia have segments containing natural uranium at the upper and lower ends thereof, respectively. In addition, the length of the natural uranium segment at the upper end of the gadolinia fuel rod can be longer than that of the natural uranium segment at the upper end of the fuel rod that contains no gadolinia.

Further, the gadolinia fuel rod having the enriched gadolinium can be configured so as to comprise the natural uranium segments at the upper and lower ends each, and so that the length of the natural uranium segment at the upper end is three twenty-fifth or more the effective length of the gadolinia fuel rod.

A fourth aspect of the present invention is a fuel assembly comprising a plurality of fuel rods bundled in grid pattern, a part of the fuel rods containing gadolinium as the burnable poison. The fuel assembly is arranged with different spacing from each other thereof in the reactor core. At least one of the fuel rods having the gadolinium contains gadolinium in which at least one kind of the isotopes of odd mass number is enriched more than the isotopic abundance in the natural gadolinium. In addition, the fuel rods containing the enriched gadolinium are disposed in the region on the control rod side when divided by a diagonal line.

In the present fuel assembly, the fuel rods comprising gadolinium (gadolinia fuel rod) in which the isotope of mass number 157 (Gd-157) alone is enriched more than the isotopic abundance of the natural gadolinium may be used. Alternatively, the fuel rods comprising gadolinium in which Gd-157 and Gd-155 are enriched respectively more than the isotopic abundance of the natural gadolinium may be used.

In this fuel assembly, the content (isotopic composition of at least one of Gd-157 and Gd-155 of which neutron absorption cross sections are large is higher than the isotopic abundance of the natural gadolinium.

Accordingly, even when designing for the fuel assembly to have the same reactivity controllability, the content of gadolinia can be reduced less than that in one containing the natural gadolinium. As a result, when the gadolinia fuel rods are disposed in the region on the control rod side where the power tends to be high, the enrichment of the fissile material such as uranium or the like need not be reduced excessively. Accordingly, without damaging thermal margin of the gadolinia fuel rods, the enrichment of the fissile material averaged over the fuel assembly can be increased.

A fifth aspect of the present invention is a fuel assembly comprising a plurality of fuel rods bundled in grid pattern. A part of the fuel rods contains gadolinium as the burnable poison. At least one of the fuel rods having the gadolinium contains gadolinium in which at least one kind of the isotopes of odd mass number is enriched more than the isotopic abundance of the natural gadolinium. The fuel rods containing the enriched gadolinium are disposed on at least one of four corners of the fuel bundle in the second position inwardly from the outermost periphery.

In the fuel assembly configured thus, the gadolinia content can be reduced less than that in one having the natural gadolinium as the burnable poison. Accordingly, even when the gadolinia fuel rods are disposed at the positions of four corners of the fuel bundle positioned in the second position inwardly from the outermost periphery where the power tends to be high, it is not necessary that the enrichment of the fissile material such as uranium is reduced excessively. Without damaging thermal margin of the gadolinia fuel rods, the average enrichment of the fissile material can be increased.

A sixth aspect of the present invention is a fuel assembly comprising a plurality of fuel rods bundled in grid pattern. A part of the fuel rods contains gadolinium as the burnable poison. The fuel rods consist of long-length ones and short-length ones of which fuel effective portions are shorter than those of the long-length ones. In addition, at least at part of the positions adjacent to the short-length fuel rods, the fuel rods containing gadolinium in which at least one kind of the isotopes of the odd mass number is enriched more than the isotopic abundance of the natural gadolinium are disposed.

In the fuel assembly thus configured, the gadolinia content can be reduced less than that in one having the natural gadolinium. Accordingly, even when the gadolinia fuel rods are disposed at the positions adjacent to the short-length fuel rods that tend to be high in power, it is not necessary to reduce excessively the enrichment of the fissile material. Accordingly, without damaging thermal margin of the gadolinia fuel rods, the average enrichment of the fissile material can be increased.

A seventh aspect of the present invention is a fuel assembly comprising a plurality of fuel rods bundled in grid pattern. A part of the fuel rods contains gadolinium as the burnable poison. At least one of the fuel rods having the gadolinium contains gadolinium in which at least one kind of the isotopes of odd mass number is enriched more than the isotopic abundance of the natural gadolinium. The fuel rods containing the enriched gadolinium are disposed in at least one of the four corners.

In the fuel assembly thus configured, the gadolinia content can be reduced less than that in one having the natural gadolinium. Accordingly, even when the gadolinia fuel rods are disposed at the positions of the four corners that tend to be high in power, it is not necessary to reduce excessively the enrichment of the fissile material. Without damaging thermal margin of the gadolinia fuel rods, the average enrichment of the fissile material can be increased.

Now, in the manufacture of uranium pellets, to reduce expense and time as much as possible, it is required to limit the number of kind of the uranium enrichment to the minimum. Without decreasing the uranium enrichment averaged over the fuel assembly, in order to make the kind of the enrichments the minimum, the enrichments in the positions where the power tends to be high in the existing design needs to be increased. For this, it is necessary that the gadolinia fuel rods are disposed in the corresponding positions and the positions adjacent thereto and the output of the fuel rods is suppressed. In this case, gadolinium that is higher in the ratios of the isotopes of odd mass number than in the isotopic abundance of the natural gadolinium can be used. Thereby, without excessively lowering the uranium enrichment of the fuel rod itself, the uranium enrichments of the other fuel rods can be increased to realize uniformity of the enrichment.

That is, an eighth aspect of the present invention is a fuel assembly comprising a plurality of fuel rods bundled in grid pattern. A part of the fuel rods contains gadolinium as the burnable poison. At least one of the fuel rods having the gadolinium contains gadolinium in which at least one kind of the isotopes of odd mass number is enriched more than the isotopic abundance of the natural gadolinium. In addition, all the fuel rods excluding those containing the enriched gadolinium are uniform in the enrichments of the contained fissile material except for the upper and lower ends in the axial direction.

In the fuel assembly thus configured, the gadolinia content can be reduced less than that in one having the natural gadolinium. Accordingly, the gadolinia fuel rods can be disposed at the positions that tend to be high in power. Thereby, the enrichment of the fissile material of the peripheral fuel rods can be increased and the enrichment of the fissile material of the fuel pellet over the entire fuel assembly can be made uniform. In the present situation where the upper limit of the enrichment of the fissile material in the pellet is determined, it is made possible to increase the enrichment averaged over the bundle to the maximum and to improve fuel economy.

Thus, in the fourth through eighth aspects of the present fuel assembly, by employing gadolinium (enriched gadolinium) higher in the isotopic composition of the isotopes of odd mass number than that of the natural abundance, the enrichment of the fissile material is heightened and the fuel economy can be improved.

Now, the aforementioned enriched gadolinium has the following action and effect. That is, the gadolinia concentration is determined so that gadolinium, after the burnout at the operation cycle end, does not cause a reactivity loss. However, the gadolinium isotopes that burn out are Gd-155 and Gd-157 that are large in the neutron absorption cross section and the contents of the other isotopes decrease or increase only a little bit. Accordingly, gadolinium as a whole, the neutron absorption is maintained and this causes the reactivity loss.

However, when for instance Gd-157 is enriched more than its natural abundance, there is only a little neutron absorption due to Gd-158 generated by the neutron absorption of Gd-157, and as a whole the reactivity loss is largely decreased. Accordingly, it is preferable to dispose gadolinium higher in the ratios of the isotopes of odd mass number than in the natural isotopic abundance at the end portions of the axial direction where the power is particularly low to be abundant in gadolinium residues.

A ninth aspect of the present invention is a fuel assembly comprising a plurality of fuel rods bundled in grid pattern. A part of the fuel rods contains gadolinium as the burnable poison. In at least one piece of the fuel rod contains the gadolinium and the upper and/or lower end portions in the axial direction contains gadolinium in which at least one kind of the isotopes of odd mass number is enriched more than the isotopic abundance of the natural gadolinium.

In the fuel assembly thus configured, the reactivity loss at the cycle end can be reduced to improve a burnup efficiency of the fuel.

The gadolinium in which the isotope of odd mass number is enriched more than the natural isotopic abundance has the following action and effect. That is, by increasing the isotopic composition of Gd-157 or the like of which neutron absorption cross section is large, reactivity controllability per one gadolinia fuel rod can be increased to result in a decrease in the number of the gadolinia fuel rods per one fuel assembly.

In general, when the number of the gadolinia fuel rods is decreased, a power peaking coefficient of the fuel rod at the initial stage of burnup becomes smaller and fuel rod power density also becomes smaller, resulting in preferable situation from the core performance. Furthermore, when the gadolinia fuel rods are adjacently disposed in the existing design, due to the decrease of the reactivity controllability, it is necessary that a number of the gadolinia fuel rods is increased. However, in the fuel assembly where the gadolinia fuel rods are adjacently disposed as mentioned above, the gadolinium that is enriched more than the natural isotopic abundance in the isotopes of odd mass number can be used.

A tenth aspect of the present invention is a fuel assembly comprising a plurality of fuel rods bundled in grid pattern. A part of the fuel rods contains gadolinium as the burnable poison. Two or more. pieces of the fuel rods containing the gadolinium are disposed to adjoin through a face. At least one of the fuel rod disposed adjoining through the face contains gadolinium in which at least one kind of the isotopes of odd mass number is enriched more than the isotopic abundance of the natural gadolinium.

In the fuel assembly thus configured, even when the gadolinia fuel rods are disposed adjacent, the number of the gadolinia fuel rods can be suppressed. Accordingly, the power peaking coefficient of the fuel rod can be suppressed to insure thermal margin of the fuel rod.

Furthermore, in the design of the fuel assembly, there is a demand of increasing an amount of the fissile material loading for one fuel assembly. When the spacing between the fuel rods is set constant, to make an area that the fuel rods occupy as large as possible, there has been developed a technology where two or more kinds of fuel rods different in diameter are prepared and these are alternately disposed. When a fuel assembly is configured with a plurality of kinds of fuel rods of different diameter, there are other advantages.

In the fuel assembly thus configured, when gadolinia is contained in a fuel rod of smaller diameter, it is necessary to increase a content of gadolinia since in the fuel rod of smaller diameter gadolinium burns out earlier. However, when the content of gadolinia is increased, thermal conductivity becomes lower, resulting in poor thermal margin. However, when gadolinium that is enriched in the isotopes of odd mass number more than the natural isotopic abundance is used for the fuel rods of smaller core diameter, the content of the gadolinia can be reduced.

That is, a fuel assembly comprising a plurality of fuel rods bundled in grid pattern, a part of the fuel rods containing gadolinium as the burnable poison, can be configured as follows. That is, the fuel rods have at least two kinds of diameters and at least a part of the fuel rods of the smallest diameter contains gadolinium in which at least one kind of the isotopes of odd mass number is enriched more than the isotopic abundance of the natural gadolinium being contained.

In the fuel assembly thus configured, even in the fuel rods of smaller diameter, the content of gadolinia can be suppressed and thereby thermal margin of the gadolinia fuel rods can be insured.

An infinite multiplication factor of the fuel assembly in which gadolinium consists only of Gd-157, in comparison with the case of the natural gadolinium being used, shows a sharp and large peak value. It invites conditions unfavorable to core performance such as deterioration of reactor shut-down margin and an increase of channel peaking. By making the infinite multiplication factor a relatively mild peak, the aforementioned problems can be overcome.

That is, a fuel assembly comprising a plurality of fuel rods bundled in grid pattern, a part of the fuel rods containing gadolinium as the burnable poison, can be configured as follows. That is, the gadolinia fuel rods containing the gadolinium have at least two kinds of diameters, and at least a part of the gadolinia fuel rods contains gadolinium in which at least one kind of the isotopes of odd mass number is enriched more than the isotopic abundance of the natural gadolinium.

In the fuel assembly thus configured, even when the gadolinia content is the same, due to the difference of the core diameter of the fuel rods, the specific burnup where the fuel burns out is different. Accordingly, the specific burnup where the infinite multiplication factor reaches its peak is different depending on the fuel rod, and the variation of the infinite multiplication factor of the fuel assembly as a whole becomes moderate. A deterioration of the reactor shut-down margin and an increase of channel peaking are not caused.

Furthermore, in the technology where gadolinium enriched in the isotopes of odd mass number more than the natural abundance is used, there are the following problems to be solved. That is, there is a case where a difference of the gadolinia concentration in its axial direction is disposed in one fuel rod. In that case, so as to enable to detect, by means of the non-destructive inspection after manufacture, the gadolinia concentration distribution in the axial direction, it is necessary to give the concentration difference of more than the minimum detection limit. By contrast, the isotopes of gadolinium of odd mass number being large in their neutron absorption cross section, their gadolinium contents are low. Accordingly, it is difficult to give the necessary concentration difference. In the present invention, in view of such situation, the fuel assembly can be configured as mentioned below.

That is, a fuel assembly comprising a plurality of fuel rods bundled in grid pattern, a part of the fuel rods containing gadolinium as the burnable poison, can be configured in the following way. That is, gadolinium in which at least one kind of the isotopes of odd mass number is enriched more than the isotopic abundance of the natural gadolinium, and the natural gadolinium are used, respectively. In addition, in the gadolinia fuel rod containing the natural gadolinium, there is disposed a difference in the concentrations of the natural gadolinium contained in the segments in the axial direction excluding the upper and lower ends.

In the fuel assembly thus configured, when the gadolinia concentration is differentiated in the axial direction of the fuel rod, since the natural gadolinium is contained relatively much, the concentration difference in the axial direction can be easily given to be detectable. On the other hand, in the positions where the power is large, the gadolinium enriched in the isotopes of odd mass number more than the natural isotopic abundance can be used and there is no necessity of lowering the enrichment of the fissile material.

The fifth through tenth aspects of the present invention can be applicable to the fuel grid pattern other than the D lattice. Furthermore, the sixth aspect can be applicable only to the fuel assembly having the short-length fuel rods, and the other aspects can be applicable whether there are short-length fuel rods or not.

A nuclear reactor of the present invention has any one of the fuel assemblies set forth in the first to tenth aspects and the fuel assembly comprising the natural gadolinium, respectively. Here, an average concentration of gadolinium in the fuel assembly comprising the natural gadolinium is larger than that of gadolinium in the fuel assemblies according to the first to tenth aspects.

BRIEF DESCRIPTION OF THE DRAWINGS

FIG. 16 is a transversal sectional view showing an arrangement of fuel rods in the thirteenth embodiment of the present invention, FIG. 17 is a transversal sectional view showing an arrangement of fuel rods in the fourteenth embodiment of the present invention.

DETAILED DESCRIPTION OF THE PREFERRED EMBODIMENTS

In the following, preferred embodiments of the present invention will be described.

Embodiment p1

Figure 1A:
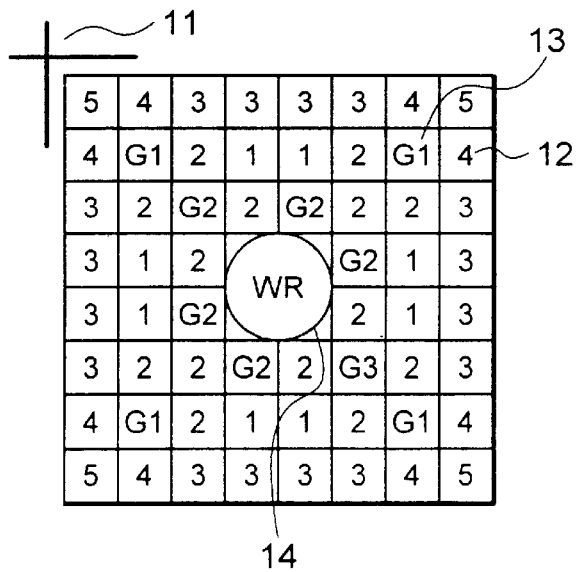
FIG. 1A is a transversal sectional view showing an arrangement of fuel rods in the first embodiment of the present invention, FIG. 1B being a diagram showing, enrichment distributions of fissile material and concentration distributions of gadolinia in an axial direction of the fuel rods, in the first embodiment.

FIG. 1A is, in a first embodiment of a fuel assembly of the present invention, a transversal sectional view showing an arrangement of fuel rods 12 and 13 with a control rod 11 in an upper left position. The fuel rods 12 that contain no gadolinia are shown with reference marks 1, 2, 3, 4, and 5 for individual types, the gadolinia fuel rods 13 being shown with G1, G2, and G3, respectively. Furthermore, WR denotes a water rod 14.

Figure 1B:
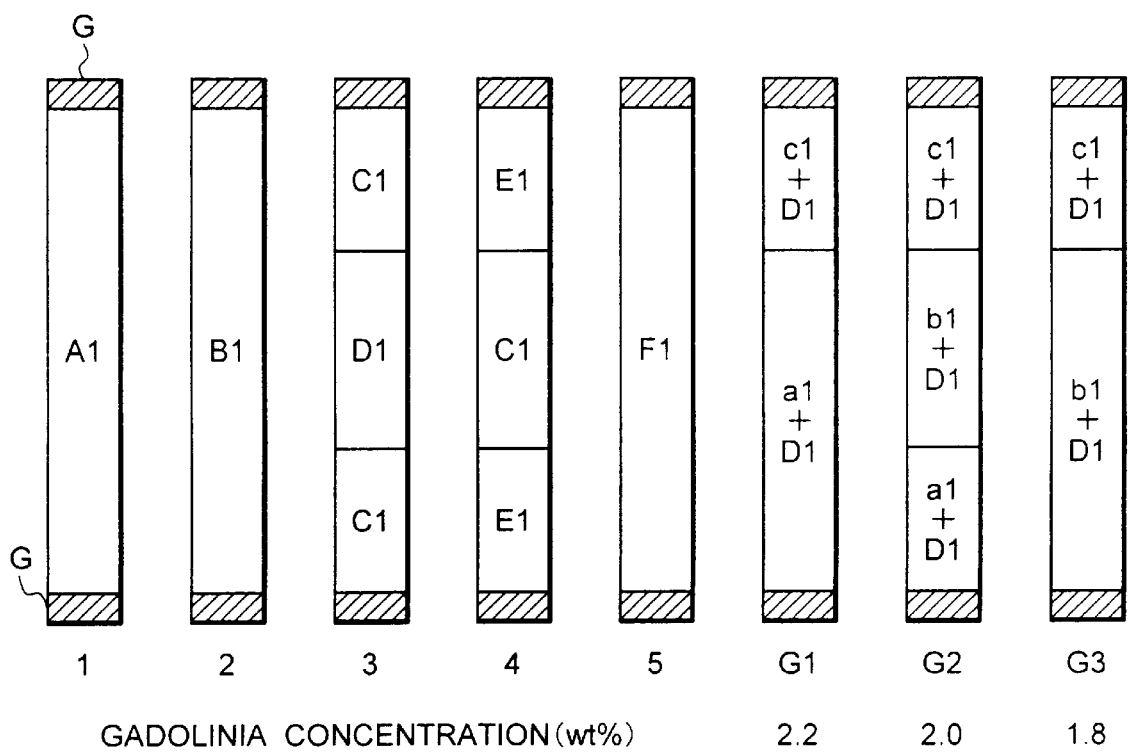

FIG. 1B, in the fuel assembly of the first embodiment, is a diagram showing enrichment distributions of fissile material and concentration distributions of gadolinia, in a vertical direction (axial direction) of the fuel rods (1, 2, 3, 4, 5 G1, G2, and G3), respectively.

Furthermore, in the present embodiment, the isotopic composition of gadolinium constituting gadolinia is shown in Table 1.

TABLE 1

| Gd isotope | Relative content |
|---|---|
| Gd-155 | 30 wt % |
| Gd-157 | 50 wt % |
| Other than the above | 20 wt % |

In this embodiment, the respective isotopic compositions of Gd-155 and Gd-157 are 30 wt % and 50 wt %, and both isotopes are enriched more than the natural isotopic abundance of the natural gadolinium. A particular isotope of gadolinium can be enriched by means of atomic vapor laser isotope separation (AVLIS).

The fuel rods (1, 2, 3, 4, 5, G1, G2, and G3) have a plurality of segments of different enrichments of a fissile material (for instance, uranium). The uranium enrichments in the respective segments are in the decreasing order of A1>B1>C1>D1>E1>F1>G. In the case of uranium being used as the fissile material, an enrichment of uranium is that of uranium 235. G denotes the enrichment of the fissile material in uranium, that is 0.2 wt %. In addition, the enrichment D1 is approximately identical with the enrichment of the fissile material averaged over an entire fuel assembly.

All fuel rods (1, 2 and 5) that contain no gadolinia, including the segments of the upper and lower ends that contain the natural uranium alone, are divided into three segments in the axial direction, the fuel rods (3 and 4) are divided into five segments. As shown in FIG. 1A, all the fuel rods of which uranium enrichment is the highest (1) and the fuel rods of which enrichment is the second highest (2) are not disposed on the outermost periphery of the fuel assembly.

There are three kinds of G1, G2 and G3 of the gadolinia fuel rods 13 and the upper and lower ends thereof are provided with the natural uranium segments that contain the natural uranium alone. The intermediary portion excluding the natural uranium segments at the upper and lower ends has a plurality of segments of different gadolinia concentrations. For the respective segments, three kinds of the gadolinia concentrations of a1 (2.5 wt %), b1 (2.0 wt %) and c1 (1.5 wt %) are applied and a difference of the gadolinia concentrations of adjacent segments is set at 0.5 wt % or 1.0 wt %. The average gadolinia concentrations of the respective gadolinia fuel rods are 2.2 wt % for G1, 2.0 wt % for G2 and 1.8 wt % for G3. The uranium enrichments for the respective segments are all D1.

The operation term M per one cycle assumed for the fuel assembly is 15 months and the power density P is 50 kw/l. In the present embodiment, the gadolinia concentration G0 averaged over the entire gadolinia fuel rod is approximately 2.06 wt %, being less than 2.3, the value obtained from 0.25·P·M/W (=0.25×50×15/(50+30)). That is, the expression (G0<0.25·P·M/W) holds and the gadolinia concentration is set so that gadolinia almost burns out at the cycle end.

Figure 2:
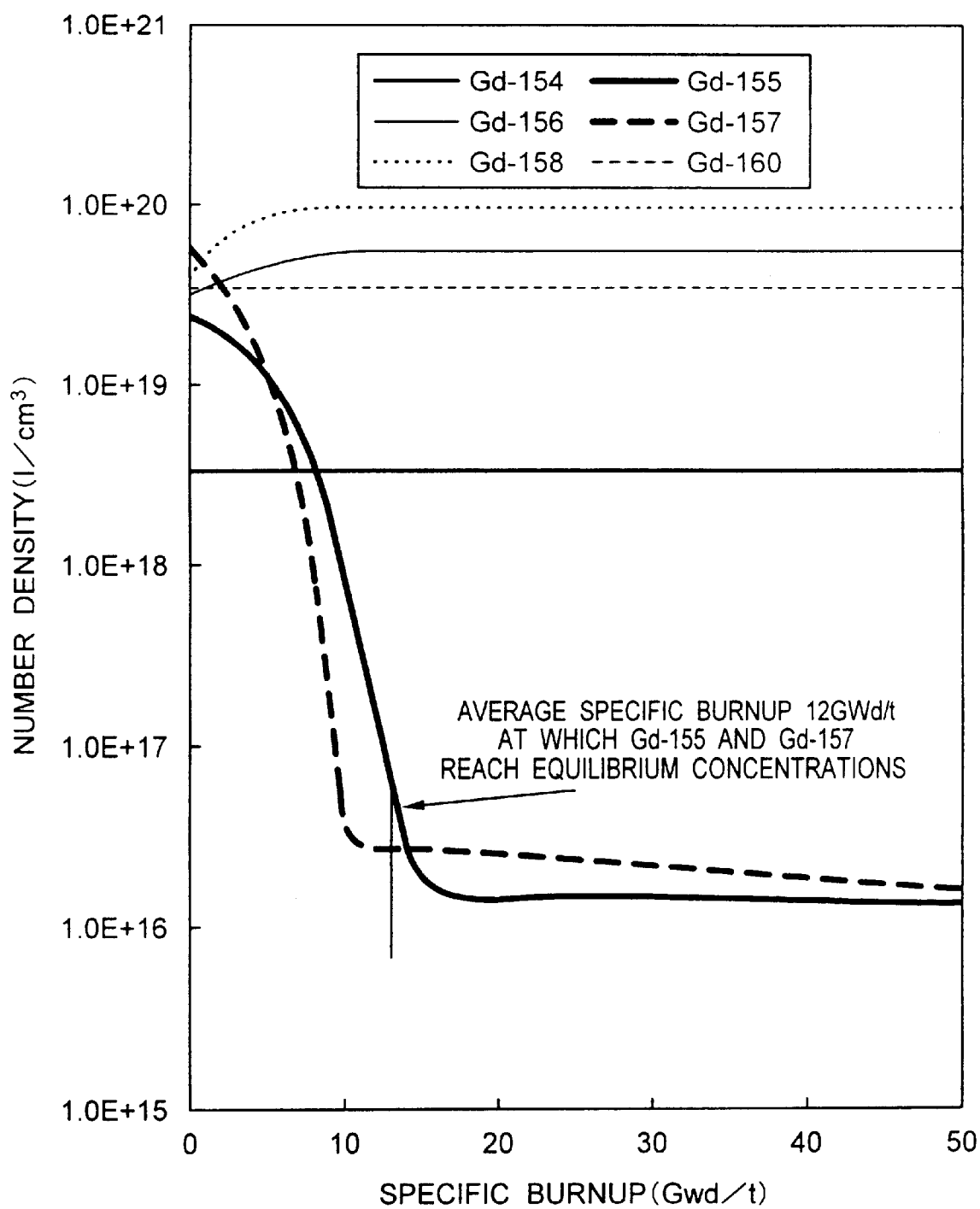
FIG. 2 is a diagram showing variations of number densities due to burnup of gadolinium isotopes in the first embodiment.

FIG. 2 shows, in the first embodiment of the present invention, variations of the number densities of the gadolinium isotopes accompanying the burnup. At the specific burnup of 12 GWd/t corresponding to the cycle end, Gd-155 and Gd-157 reach their equilibrium concentrations, respectively. That is, the gadolinia concentration is found to be appropriate to be essentially burned out at the cycle end. When the gadolinia concentration averaged over the entire bundle is 2.3 wt % or less, the gadolinia burns out. However, when the gadolinia concentration is more than 2.3 wt %, the residual reactivity of gadolinia at the cycle end increases drastically.

As shown in the above, in the fuel assembly of the first embodiment, gadolinium oxide (enriched gadolinia) in which Gd-155 and Gd-157 each are enriched more than the isotopic abundance of the natural gadolinium is used. As a result, the gadolinia concentration can be lowered to one half or less that of the fuel assembly using the natural gadolinia. Accordingly, the thermal conductivity of the gadolinia fuel rod can be remarkably improved. Furthermore, that Gd-155 and Gd-157 are enriched more than the isotopic abundance of the natural gadolinium accompanies a decrease of the isotopic abundance of Gd-156, resulting in a decrease of poison reactivity due to the residual gadolinium. As a result, in comparison with the fuel assembly in which the natural gadolinia is used, a necessary enrichment of the fissile material can be decreased. The specific burnup is increased in the case of the enrichment of the fissile material being set the same.

Furthermore, in the fuel assembly of the first embodiment, in the fuel rods that contain no gadolinia, the average enrichment of the fissile material is larger in the upper or lower portion than in the central portion. In addition, the gadolinia concentration in the lower portion of the gadolinia fuel rod is larger than that in the upper portion. Accordingly, these conditions are well suited for a core of a boiling water nuclear reactor of which power shows the lower peak, resulting in a decrease of the power peaking.

In the first embodiment, the isotopic compositions of Gd-155 and Gd-157 are 30 wt % and 50 wt %, respectively. However, when Gd-155 and Gd-157 each is enriched more than the isotopic abundance of the natural gadolinium, the identical effect can be obtained. In that case, the gadolinia concentration G0 may be set to satisfy $G0<0.25 \cdot P \cdot M/W$.

Embodiment 2

Figure 3A:
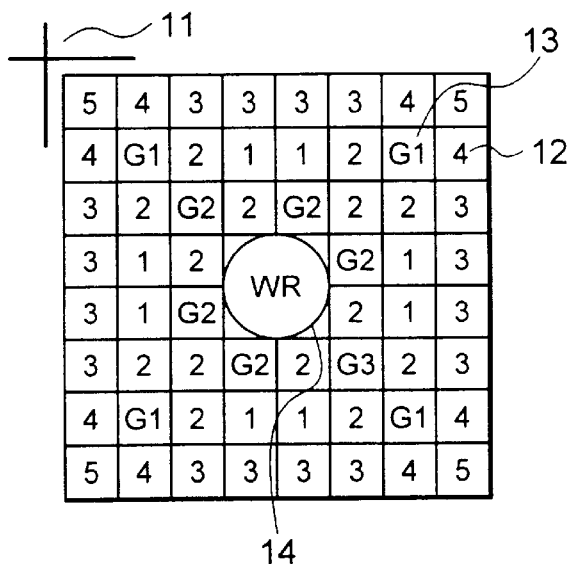
FIG. 3A is a transversal sectional view showing an arrangement of fuel rods in the second embodiment of the present invention, FIG. 3B being a diagram showing enrichment distributions of fissile material and concentration distributions of gadolinia in an axial direction of the fuel rods, in the second embodiment.

FIG. 3A is, in a second embodiment of a fuel assembly of the present invention, a sectional view in a transversal direction showing an arrangement of the fuel rods with the control rod 11 in the upper left position. Reference marks 1, 2, 3, 4, and 5 denote the fuel rods that contain no gadolinia and reference marks G1, G2 and G3 denotes the gadolinia fuel rods, respectively. WR denotes the water rod 14.

Figure 3B:
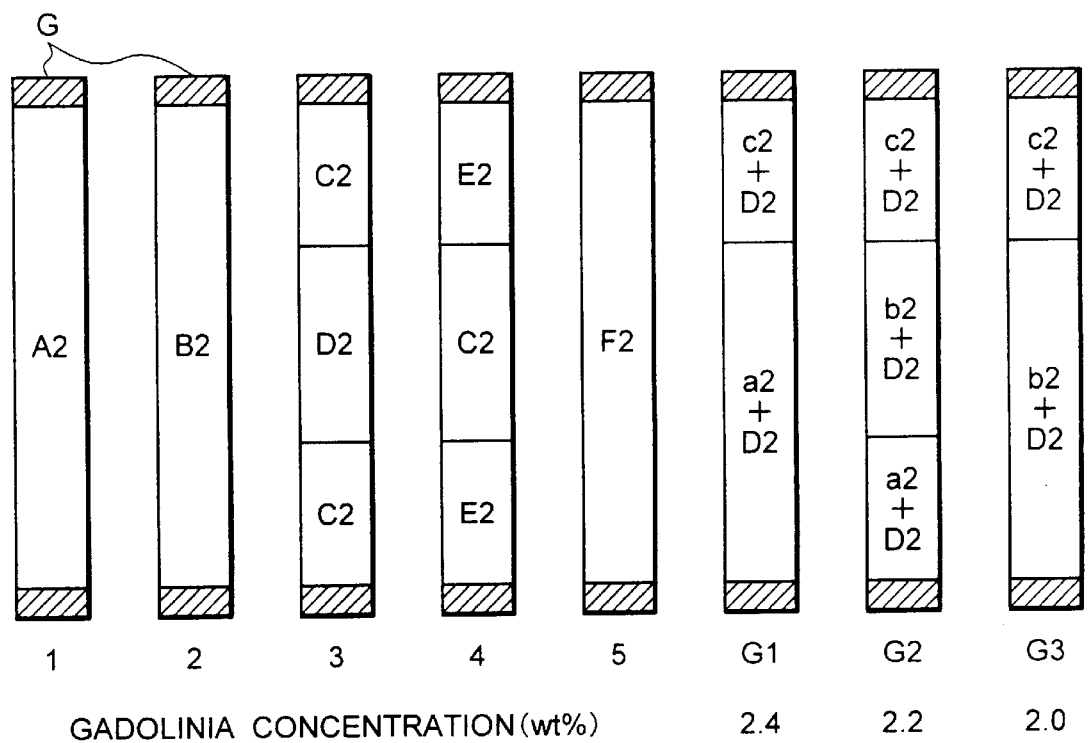

FIG. 3B is, in the second embodiment, a diagram showing enrichment distributions of the fissile material (uranium) and gadolinia concentration distributions, in an axial direction of the fuel rods (1, 2, 3, 4, 5, G1, G2 and G3). In this embodiment, the isotopic composition of gadolinium constituting gadolinia is shown in Table 2.

TABLE 2

| Gd isotope | Relative content |
| --- | --- |
| Gd-155 | 5 wt % |
| Gd-157 | 60 wt % |
| Other than the above | 35 wt % |

As shown in table 2, only Gd-157 is enriched more than in the natural gadolinium and the isotopic composition of Gd-155 is lowered less than that in the natural gadolinium.

In FIG. 3B, A2 through F2 each denotes the enrichment of uranium that is the fissile material and is in the decreasing order of A2>B2>C2>D2>E2>F2>G. G denotes the enrichment of uranium in the natural uranium, that is, 0.2 wt %. Furthermore, a2 through c2 each shows the gadolinia concentration, and a2 is 2.7 wt %, b2 2.2 wt %, c2 1.7 wt %. The average gadolinia concentrations of the respective gadolinia fuel rods are 2.4 wt % for G1, 2.2 wt % for G2 and 2.0 wt % for G3.

In this embodiment, when the operation cycle term is 15 month and the power density is 50 kw/l, the gadolinia concentration G0 averaged over the entire fuel rods is less than the value of 2.9 that is obtained from $0.25 \cdot P \cdot M/W$ $(=0.25 \times 50 \times 15/(60+5))$. That is, the expression $G0<0.25 \cdot P \cdot M/W$ holds. Furthermore, in the present embodiment, a ratio of the content of Gd-155 to that of Gd-157 is one twelfth, that is, less than 0.1.

As described above, Gd-155 has the neutron absorption cross section of approximately one fourth that of Gd-157 to be delayed in burnup with respect to Gd-157. Accordingly, there occurs a problem that Gd-155 remains after the burnup to cause the residual reactivity. However, by controlling Gd-155 at lower concentrations than that of Gd-157, the specific reactivity at which the both burn out can be approached.

Figure 4:
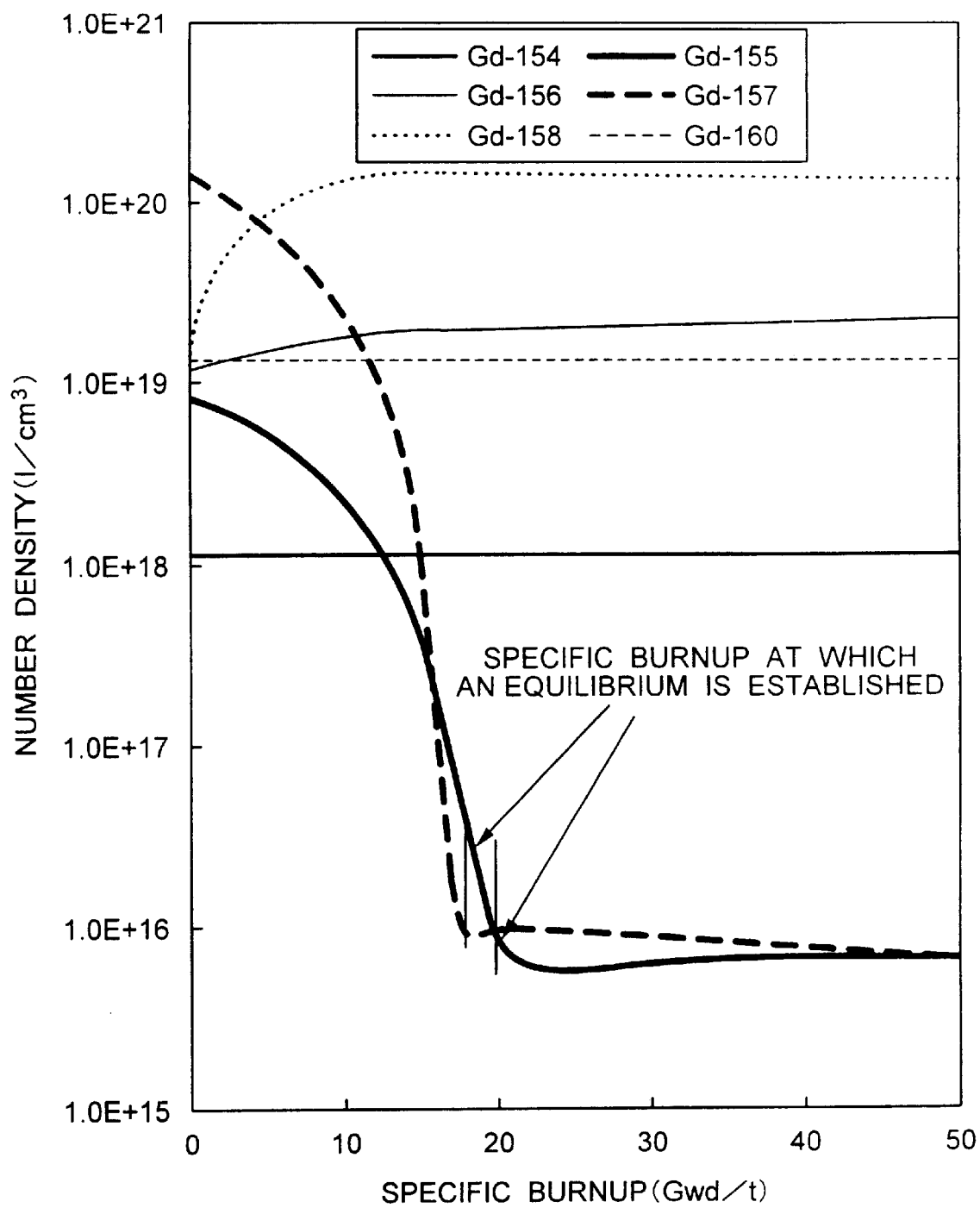
FIG. 4 is a diagram showing variations of number densities due to burnup of gadolinium isotopes in the second embodiment.
Figure 5:
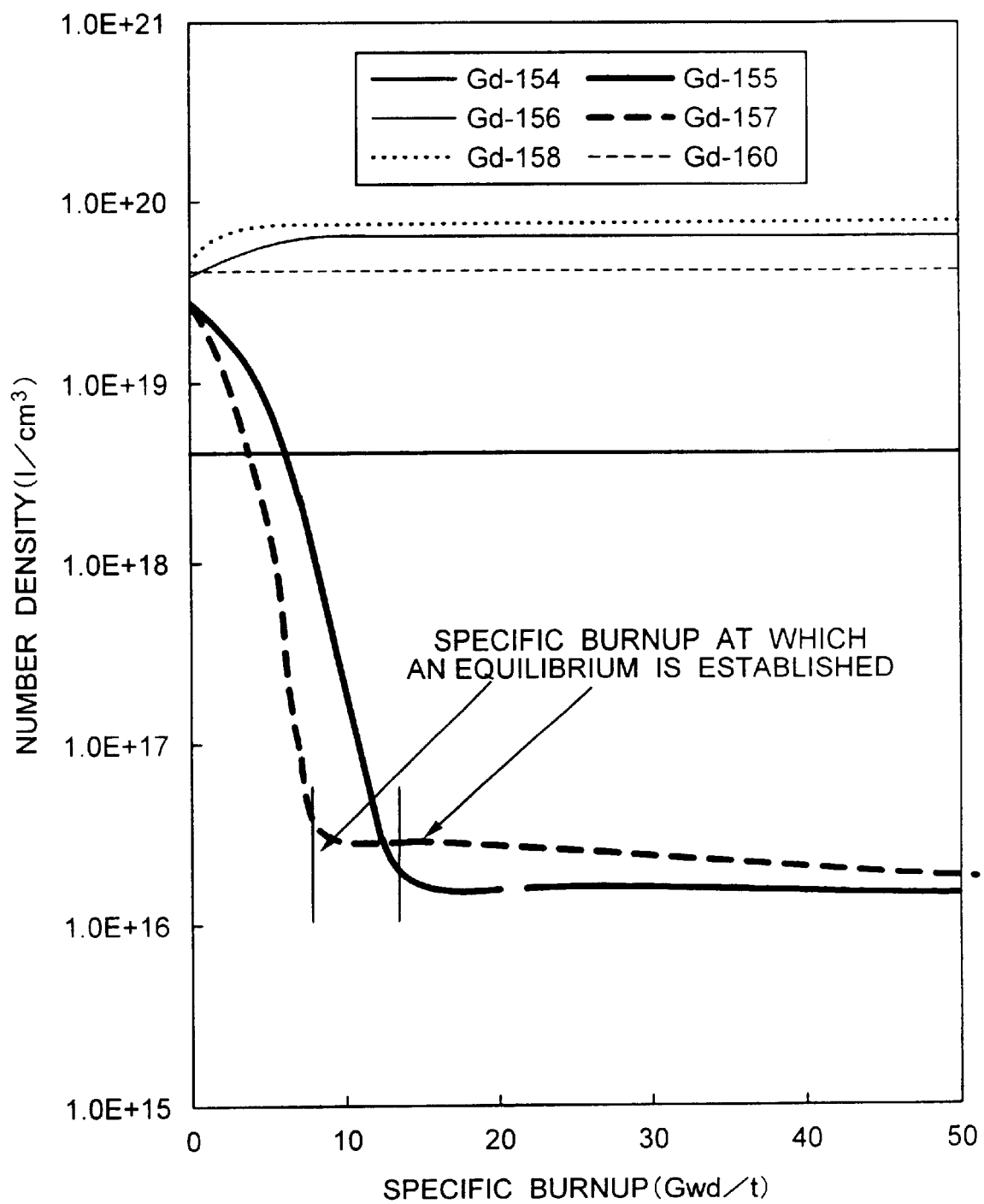
FIG. 5 is a diagram showing variations of number densities due to burnup of gadolinium isotopes in a fuel assembly having natural gadolinia.

The variation of the number densities of the respective gadolinium isotopes with the burnup in the second embodiment is shown in FIG. 4. The specific reactivity at which the gadolinium isotopes establish equilibrium concentrations is approximately 20 GWd/t for Gd-155 and approximately 18 GWd/t for Gd-157. Both are found to burn out at the substantially same specific reactivity. FIG. 5 shows the variation of the respective gadolinium isotopes with the burnup when the natural gadolinium is used. From the figure, when the natural gadolinium is used, Gd-155 is found to delay largely in the burnup.

As mentioned above, in the fuel assembly of the second embodiment, by decreasing the content (isotopic composition) of Gd-155 to one tenth or less that of Gd-157, the specific reactivity at which Gd-155 and Gd-157 burn out is made approximately the same and the residual reactivity of Gd-155 is decreased.

Next, the third to seventh embodiments of the present invention will be explained.

In the third to seventh embodiments, the fuel rods (1, 2, 3, 4, 5, G1, G2 and G3) are arranged in the periphery of the water rod WR, as shown in FIG. 1A that is a transversal sectional view of the first embodiment.

Embodiment 3

Figure 6:
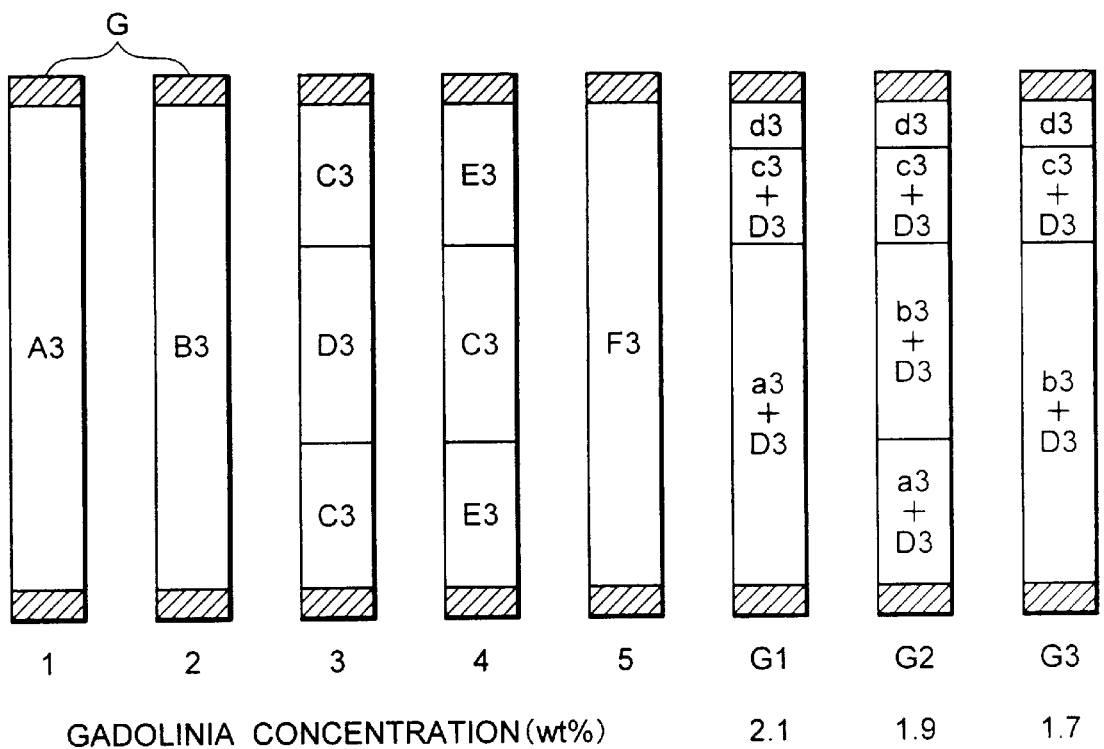
FIG. 6 is a diagram showing enrichment distributions of fissile material and concentration distributions of gadolinia in an axial direction of the fuel rods, in the third embodiment.

In the third embodiment, the fuel rods (1, 2, 3, 4, and 5) containing no gadolinia and the gadolinia fuel rods (G1, G2 and G3) have the distributions in the axial direction of the enrichment of the fissile material (uranium) and the gadolinia concentration, as shown in FIG. 6. In the figure, A3 through F3 denote the enrichments of uranium and are in the decreasing order of A3>B3>C3>D3>E3>F3>G. G denotes the enrichment of uranium in the natural uranium, that is, 0.2 wt %. Furthermore, a3 through d3 each denotes the gadolinia concentrations, a3 being 2.5 wt %, b3 2.0 wt %, c3 1.5 wt % and d3 1.0 wt %. Gadolinium constituting gadolinia, as identical with the first embodiment, has the isotopic composition shown in Table 1.

Thus, in the fuel assembly of the third embodiment, a segment having the lowest gadolinia concentration of d3 is added to the upper end portion (just below the natural uranium segment) of the gadolinia fuel rod having the uranium enrichment and the gadolinia concentration shown in FIG. 1B. The uranium enrichment of the added segment is also D3 common to the entire gadolinia fuel rod. However, in FIG. 6, D3 in the added segment is omitted and only the gadolinia concentration is shown. The average gadolinia concentrations of the gadolinia fuel rods are 2.1 wt % for G1, 1.9 wt % for G2 and 1.7 wt % for G3.

In general, in the segment close to the upper end of the fuel rod, the power becomes lower to delay the burnup, resulting in the gadolinia residues to cause the residual reactivity. However, in the third embodiment, the segment of which gadolinia concentration is the lowest is added to the upper end portion. Accordingly, the gadolinia residues at the upper end portion of the fuel rod can be reduced. Whereas in the present embodiment both Gd-155 and Gd-157 are enriched in comparison with the natural gadolinia, even in the fuel assembly containing gadolinium enriched only in Gd-157, the identical effect can be obtained.

Embodiment 4

Figure 7:
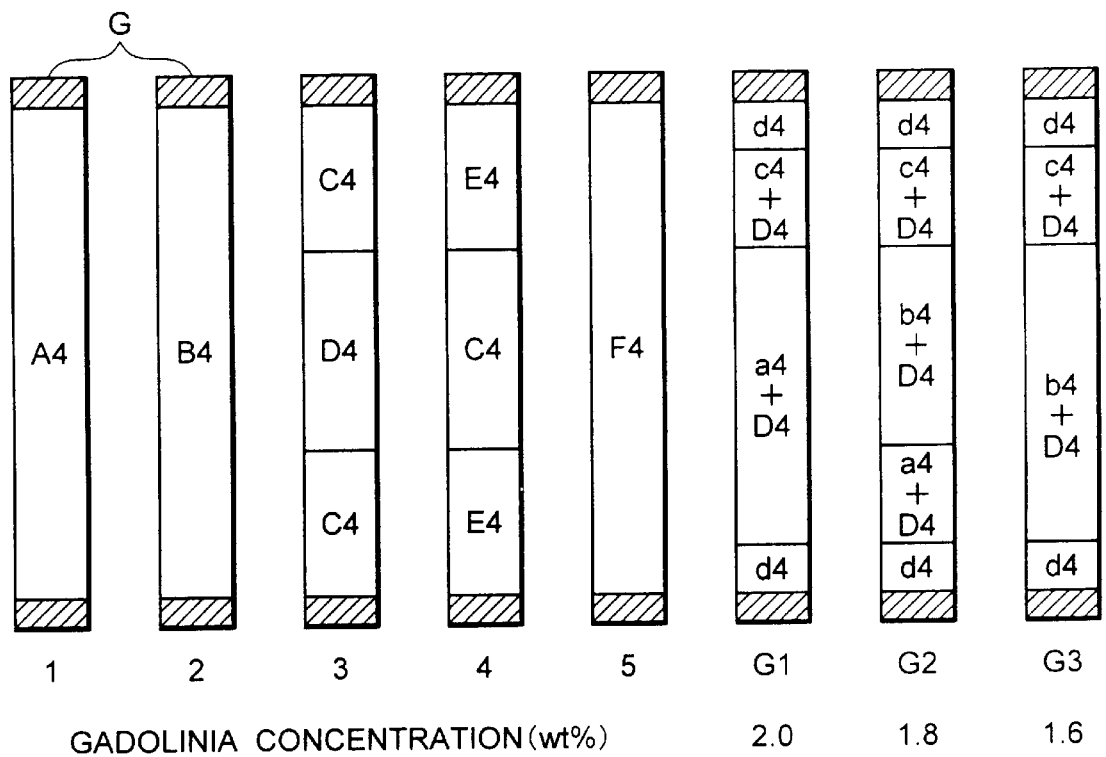
FIG. 7 is a diagram showing enrichment distributions of fissile material and concentration distributions of gadolinia in an axial direction of the fuel rods, in the fourth embodiment.

In the fourth embodiment, the fuel rods (1, 2, 3, 4, and 5) containing no gadolinia and the gadolinia fuel rods (G1, G2 and G3) have the distributions in the axial direction of the enrichment of the fissile material (uranium) and the gadolinia concentration, as shown in FIG. 7. That is, in the gadolinia fuel rods (G1, G2 and G3), a segment having the lowest gadolinia concentration of d4 is further added to the lower end portion of the gadolinia fuel rod having the uranium enrichment and the gadolinia concentration shown in FIG. 6. The uranium enrichment of the added segment is also D4 common to the entire gadolinia fuel rod.

Gadolinium constituting gadolinia has the isotopic composition shown in Table 1 identical with the first embodiment. The average gadolinia concentrations of the gadolinia fuel rods are 2.0 wt % for G1, 1.8 wt % for G2 and 1.6 wt % for G3. The other portions of the fuel assembly are configured similarly with the third embodiment and the explanation is omitted.

In the fuel assembly of the fourth embodiment thus configured, the reactivity of the residual gadolinia can be further reduced.

Embodiment 5

Figure 8:
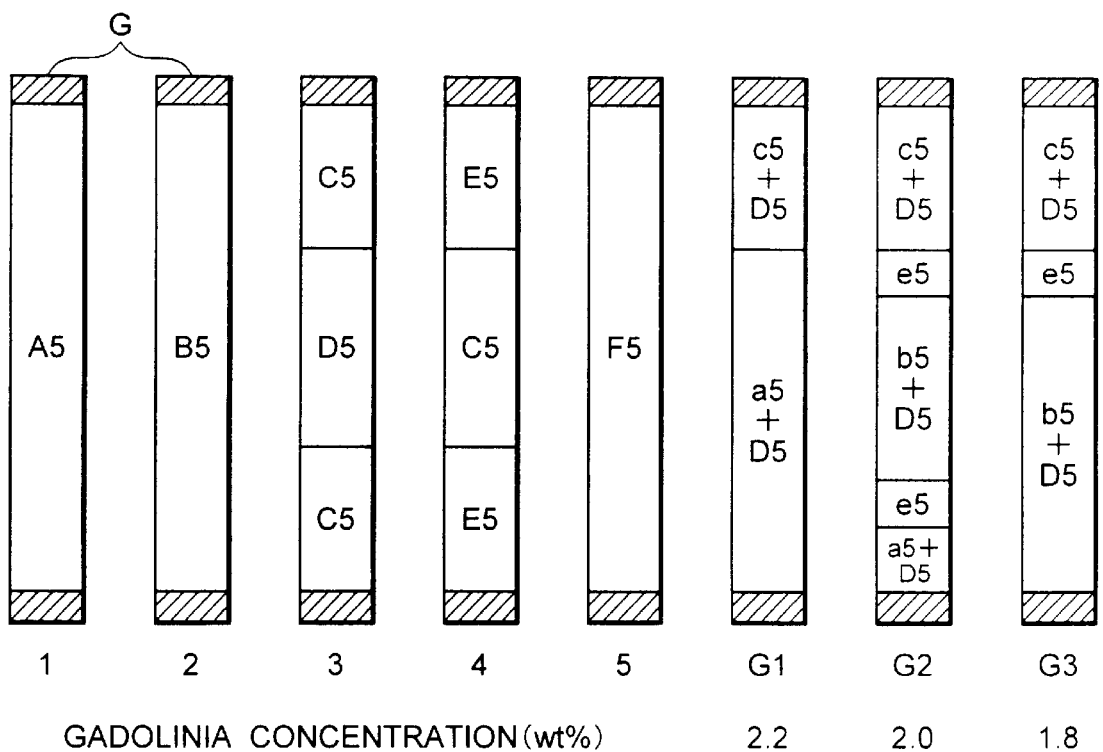
FIG. 8 is a diagram showing enrichment distributions of fissile material and concentration distributions of gadolinia in an axial direction of the fuel rods, in the fifth embodiment.

In the fifth embodiment, the fuel rods (1, 2, 3, 4, and 5) containing no gadolinia and the gadolinia fuel rods (G1, G2 and G3) have the distributions in the axial direction of the enrichment of the fissile material (uranium) and the gadolinia concentration, as shown in FIG. 8. That is, in the gadolinia fuel rods (G2 and G3), an intermediate segment having the lowest gadolinia concentration of e5 (1.0 wt %) is added between the respective segments of the gadolinia fuel rod having the distribution of the uranium enrichment and the gadolinia concentration shown in FIG. 1B. Gadolinium constituting gadolinia has the isotopic composition shown in Table 1 similarly with the first embodiment. The uranium enrichment of the added intermediate segment is also D5 common to the entire gadolinia fuel rod.

Furthermore, the added intermediate segment has a length of one twenty-fourth or less the effective length of the gadolinia fuel rod and the difference of the gadolinia concentration between the segments adjacent at least on one side is 0.5 wt % or more. The average gadolinia concentrations of the respective gadolinia fuel rods are 2.2 wt % for G1, 2.0 wt % for G2 and 1.8 wt % for G3. The other portions of the fuel assembly are configured similarly with the first embodiment, the explanation being omitted.

In the fuel assembly of the fifth embodiment thus configured, a boundary position between the gadolinia concentrations in the gadolinia fuel rod can be accurately set. That is, the gadolinia concentration in the gadolinia fuel rod is non-destructively detected after molding the fuel by taking advantage of properties as magnetic body of gadolinia. In the gadolinia fuel rods (G2 and G3), by making the difference of the gadolinia concentration between the added intermediate segment and the segment adjacent on one side 0.5 wt % or more preferable to 0.5 wt %~1 wt %, the boundary portion can be detected with higher sensitivity. Due to such high sensitivity detection, the boundary of the gadolinia concentrations in the axial direction of the gadolinia fuel rod can be accurately determined and thermal margin to safety target can be largely secured.

Embodiment 6

Figure 9:
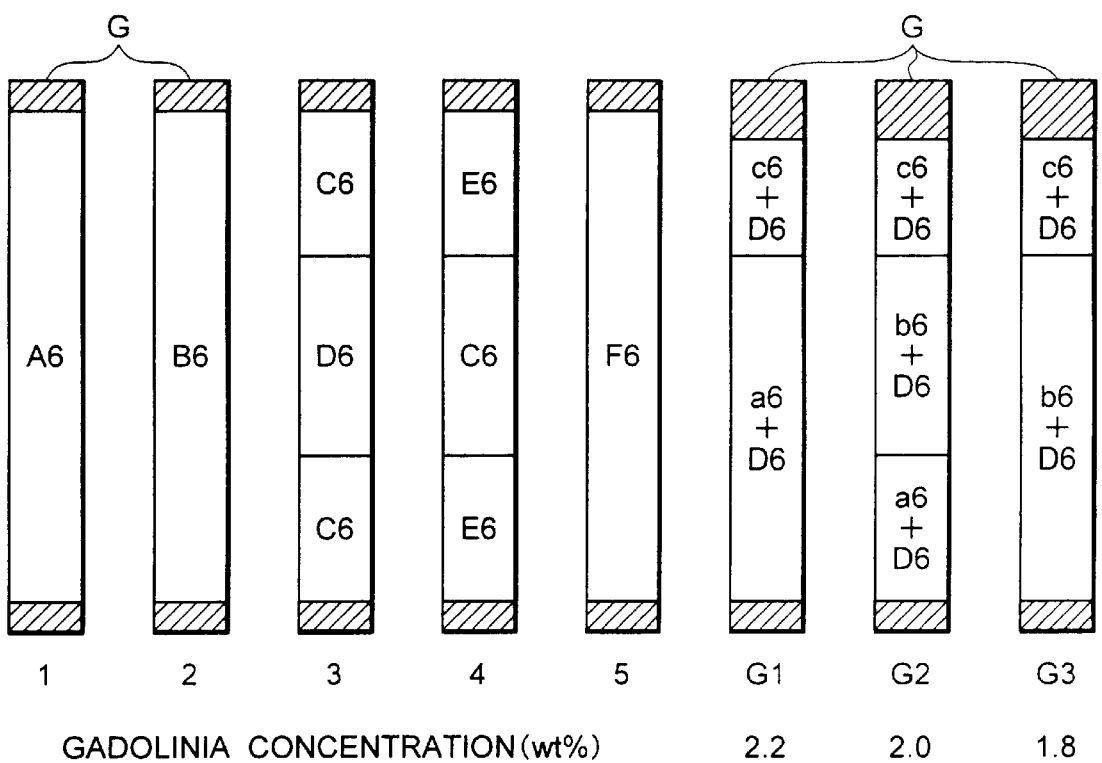
FIG. 9 is a diagram showing enrichment distributions of fissile material and concentration distributions of gadolinia in an axial direction of the fuel rods, in the sixth embodiment.

In the sixth embodiment, the fuel rods (1, 2, 3, 4, and 5) containing no gadolinia and the gadolinia fuel rods (G1, G2 and G3) have the distributions in the axial direction of the enrichment of the fissile material (uranium) and the gadolinia concentration such as shown in FIG. 9. That is, in the gadolinia fuel rods (G1, G2 and G3), the natural uranium segment at the upper end has a length of three twenty-fifths or more the effective length of the gadolinia fuel rod and is longer than the natural uranium segment at the lower end. Furthermore, it is longer in length than that of the natural uranium segment at the upper and lower ends of the fuel rods (1, 2, 3, 4, and 5) containing no gadolinia. The other portions are configured similarly with the first embodiment, the explanation being omitted.

In general, in the neighborhood of the upper end portion of the fuel rod, due to the low power, gadolinia is likely to remain. However, in the sixth embodiment, the length of the natural uranium segment at the upper end of the gadolinia fuel rod is longer than that of the natural uranium segment at the lower end. Accordingly, the residual reactivity of gadolinia at the upper end portion can be effectively reduced.

Embodiment 7

Figure 10:
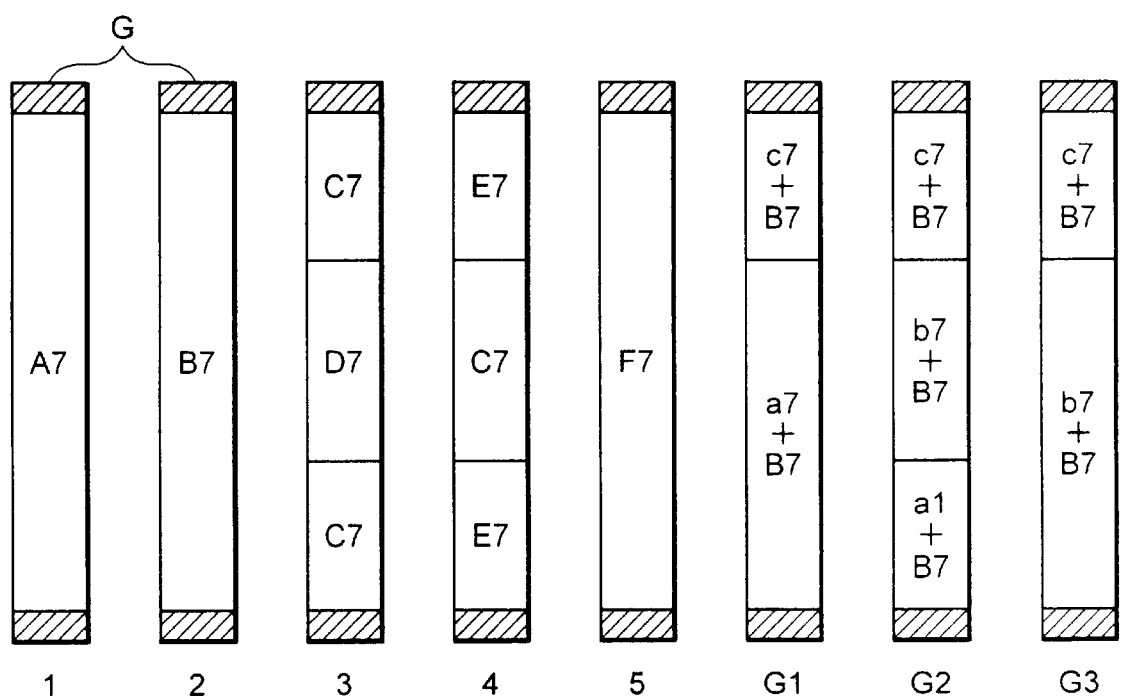
FIG. 10 is a diagram showing enrichment distributions of fissile material and concentration distributions of gadolinia in an axial direction of the fuel rods, in the seventh embodiment.

In the seventh embodiment, the fuel rods (1, 2, 3, 4, and 5) containing no gadolinia and the gadolinia fuel rods (G1, G2 and G3) have the axial direction distributions of the enrichment of the fissile material (uranium) and the gadolinia concentration such as shown in FIG. 10.

In the figure, A7 through F7 denote the enrichments of uranium that is the fissile material, respectively. A7 is 4.9 wt % or less, B7 being 4.1 wt % and A7 through F7 are in the decreasing order of A7>B7>C7>D7>E7>F7>G. The uranium enrichment averaged over the fuel assembly is 3.7 wt %.

Furthermore, in the present embodiment, gadolinium has the isotopic composition shown in Table 1 similarly with the first embodiment. The enrichment of uranium in the gadolinia fuel rods is 3.7 wt % or more, the enrichment averaged over the entire fuel assembly. Still further, the gadolinia concentration G0 averaged over the entire gadolinia fuel rods is set at a value (wt %) satisfying the inequality of G0<0.25·P·M/W.

In general, when the natural gadolinia is used, the enrichment of uranium that is the fissile material in the gadolinia fuel rod is approximately the enrichment averaged over the entire fuel assembly. However, in the fuel assembly of the seventh embodiment, gadolinia (enriched gadolinia) in which Gd-155 and Gd-157 are enriched more than the isotopic abundance of the natural gadolinium is used. Accordingly, in comparison with the fuel assembly in which the natural gadolinia is used, the concentration of gadolinia can be set lower, the maximum value of the uranium enrichment being suppressed low. Furthermore, in the case of the highest uranium enrichment being not changed, the average enrichment can be made larger to result in an increase of the specific burnup and in an improvement of burnup efficiency of the fuel.

In the above first to seventh embodiments, the fuel assembly of square grid pattern of eight-columns/eight-rows is employed to explain, however, it is similarly effective also in a fuel assembly having an arrangement of square grid pattern of nine-columns/nine-rows or more. Furthermore, the fuel assembly using only the fuel rod having gadolinium enriched in the isotopes of odd mass number more than the isotopic abundance of the natural gadolinium is used to explain. However, as a part of the fuel rods, the fuel rods having the natural gadolinia may be used.

Next, other embodiments of the present invention will be described.

Embodiment 8

Figure 11A:
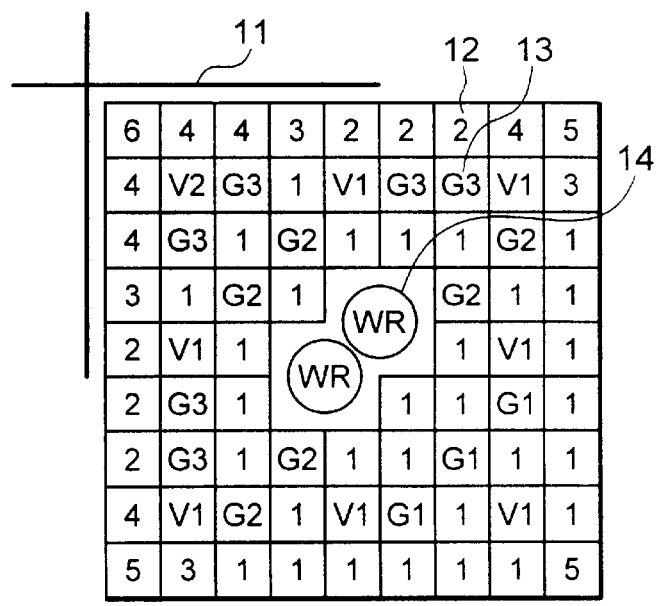
FIG. 11A is a transversal sectional view showing an arrangement of fuel rods in the eight embodiment of the present invention, FIG. 11B being a diagram showing enrichment distributions of fissile material and concentration distributions of gadolinia in an axial direction of the fuel rods, in the eight embodiment.

FIG. 11A is, in an eighth embodiment of a fuel assembly of the present invention, a transversal sectional view showing an arrangement of fuel rods 12 and 13 with the control rod 11 in an upper left position. The fuel rods 12 that contain no gadolinia are shown with reference marks 1, 2, 3, 4, 5, 6, V1 and V2 for each types, gadolinia fuel rods 13 being shown with G1, G2, and G3, respectively. The fuel rods are consisted of the long-length fuel rods shown by the reference marks of 1, 2, 3, 4, 5, 6, G1, G2, and G3, and the short-length fuel rods shown by the reference marks of V1 and V2 of which fuel effective portion is shorter than that of the long-length fuel rod. In this embodiment, the fuel assembly is loaded with a different spacing from adjacent fuel assemblies in the Reactor core comprising D lattice. WR denotes a water rod 14.

Figure 11B:
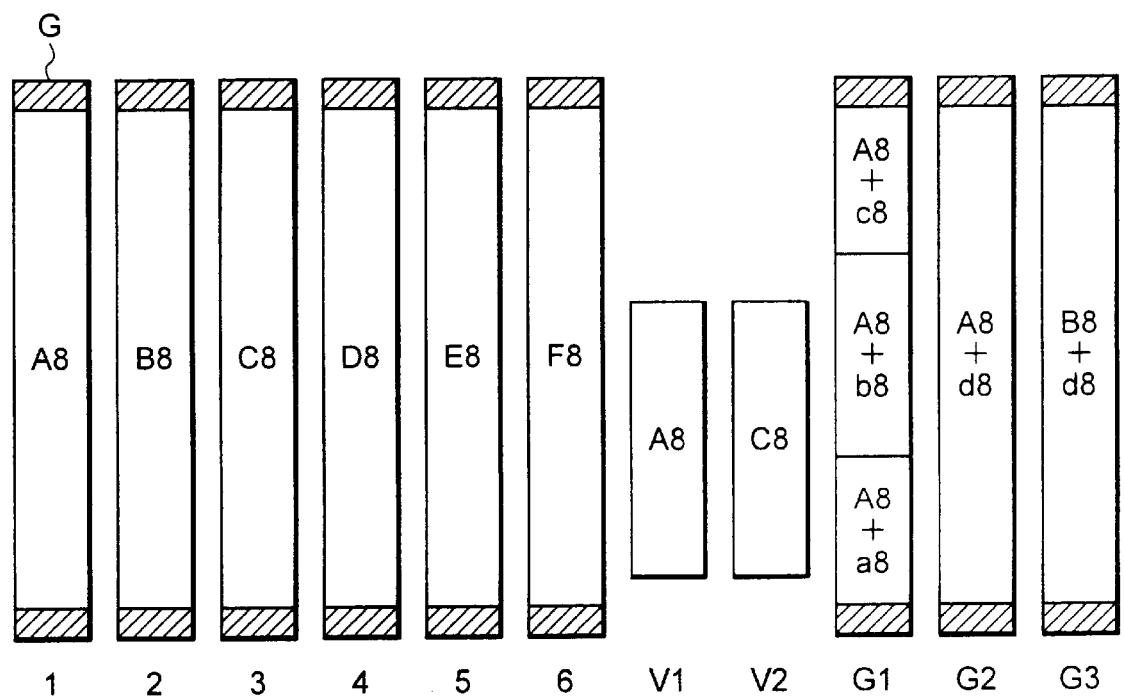

FIG. 11B is a diagram showing, in an axial direction of the fuel rods (1, 2, 3, 4, 5, 6, V1, V2, G1, G2, and G3), distributions of the enrichment of the fissile material (uranium) and concentration of gadolinia. As shown in this figure, A8 through F8 and G are used as the uranium enrichment, these being in the decreasing order of A8>B8>C8>D8>E8>F8>G. G denotes the enrichment of the natural uranium, approximately 0.2 wt %. The long-length fuel rod has the portions containing the natural uranium alone at the upper and lower ends, respectively.

In addition, as the content of gadolinia, a8 through c8 and d8 are employed. Here, a8 through c8 are concentrations of the oxide of the natural gadolinium (natural gadolinia), d8 being the concentration of oxide of the enriched gadolinium (enriched gadolinia) having the isotopic composition shown in the Table 1. These gadolinia concentrations are in the decreasing order of a8>b8>c8>d8, d8 being the value of one half or less that of a8 through c8. Furthermore, the gadolinia fuel rod (G1), excluding the upper and lower end portions constituted of the natural uranium alone, are divided into three segments in the axial direction, the gadolinia contents each being different. in the respective segments.

In the eighth embodiment, the transversal section of the fuel assembly is divided by a diagonal line into two regions of a control rod side and an opposite-control rod side. At that time, for the fuel rods disposed in the region on the opposite-control rod side (for instance, the outermost periphery), the uranium enrichment is set at the highest A8.

Whereas, for the fuel rods disposed in the region on the control rod side, the uranium enrichments of B8 through F8 that are lower than A8 are set.

Furthermore, the gadolinia fuel rods (G1) disposed in the region on the opposite-control rod side contain the natural gadolinium, the uranium enrichment being set at the highest A8. Whereas, enriched gadolinium having the isotopic composition of 30 wt % of Gd-155, 50 wt % of Gd-157 and 20 wt % of the rest is contained in the gadolinia fuel rods (G2 and G3) disposed in the region on the control rod side. Since Gd-155 and Gd-157 are remarkably large in the neutron absorption cross section, the gadolinia content necessary for maintaining the same reactivity controllability can be less than that in the case of the natural gadolinium being used. In the eighth embodiment, the concentration d8 of the enriched gadolinia is largely decreased to be one half a8 through c8, the natural gadolinia concentration, or less.

Accordingly, the uranium enrichments in the gadolinia fuel rods (G2 and G3) having enriched gadolinium can be made A8 and B8 that are larger in comparison with that of the existing fuel assembly. The uranium enrichment averaged over the fuel assembly (bundle) also can be increased from the existing value of 3.96 wt % to 4.03 wt % by approximately 0.08 wt %. due to an increase of the uranium enrichment averaged over he bundle as mentioned above, the number of fuel exchange in he fuel assembly can be decreased by approximately 1%, resulting in an improvement of fuel economy.

Embodiment 9

Figures 12A, 12B:
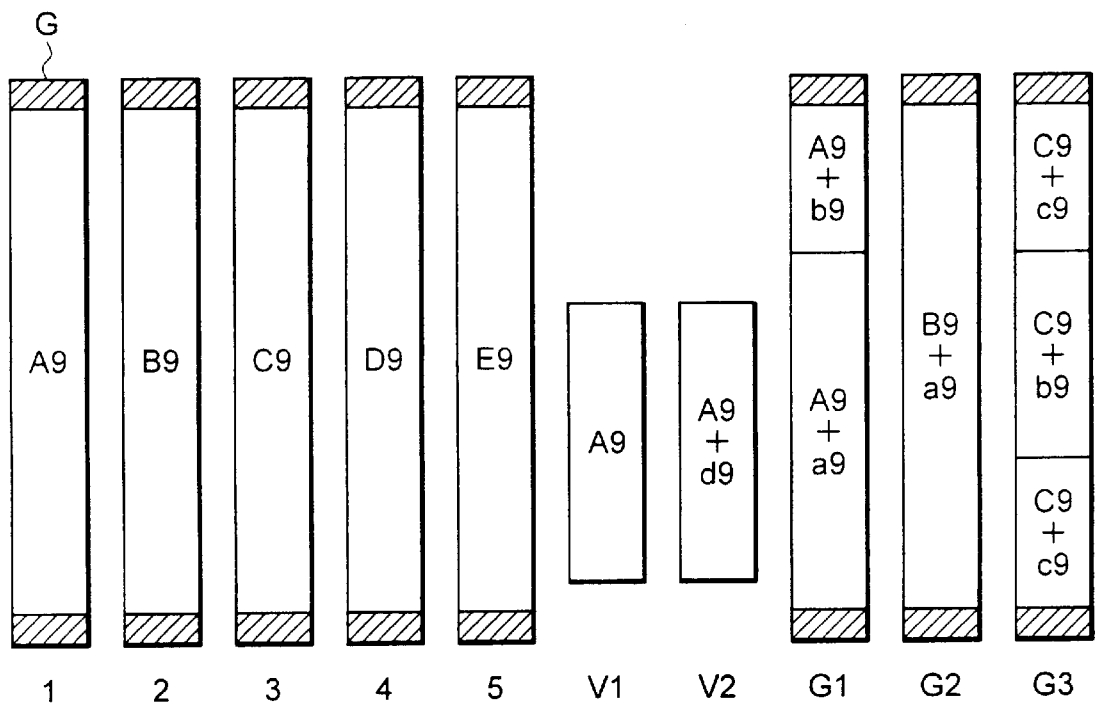
FIG. 12A is a transversal sectional view showing an arrangement of fuel rods in the ninth embodiment of the present invention, FIG. 12B being a diagram showing enrichment distributions of fissile material and concentration distributions of gadolinia in an axial direction of the fuel rods, in the ninth embodiment.

FIG. 12A is, in the ninth embodiment of the fuel assembly of the present invention, a transversal sectional view showing an arrangement of the fuel rods 12 and 13 when the control rod 11 is disposed in the upper left position. Reference marks 1, 2, 3, 4, 5, 6, G1, G2 and G3 denote the long-length fuel rods, reference marks V1 and V2 the short-length fuel rods. Furthermore, the gadolinia fuel rods 13 are shown by G1, G2, G3 and V2. The short-length fuel rod V2 is the gadolinia fuel rod containing gadolinia. WR denotes the water rod 14.

FIG. 12B is a diagram showing the distributions in the axial direction of the fuel rods (1, 2, 3, 4, 5, V1, V2, G1, G2, and G3) of the enrichment of the fissile material (uranium) and the concentration of gadolinia. As shown in the figure, the uranium enrichments of A9 through E9 and G are employed, their relationship being A9>B9>C9>D9>E9>F9>G. G denotes the enrichment of the natural uranium. In the long-length fuel rod, the portions containing the natural uranium alone are disposed at the upper and lower ends thereof.

Furthermore, the gadolinia concentrations of a9 through c9 and d9 are employed, these being in the decreasing order of a9>b9>c9>d9, d9 being one half or less of a9 through c9. Here, a9 through c9 are concentrations of the natural gadolinia, d9 being the concentration of the oxide of enriched gadolinium (enriched gadolinia) having the isotopic composition shown in the aforementioned Table 1. The gadolinia fuel rods (G1 and G3), excluding the upper and lower end portions containing only of the natural uranium, are divided in a plurality of segments in an axial direction. The gadolinia concentrations are different in the respective segments.

As shown in the figure, in the ninth embodiment, at the positions of four corners of the fuel bundle disposed in the second position inwardly from the outer most periphery, the short-length gadolinia fuel rods V2 to which enriched gadolinia is added are disposed. The isotopic composition of the enriched gadolinium, as shown in Table 1, is 30 wt % for Gd-155, 50 wt % for Gd-157, and 20 wt % for the other isotopes. The concentration d9 of the enriched gadolinia in the short-length gadolinia fuel rods (V2) is one half or less the gadolinia concentrations (a9 through c9) in the gadolinia fuel rods (G1, G2 and G3) in which the natural gadolinia is used. Accordingly, the uranium enrichment in the gadolinia fuel rod (V2) can be A9 that is larger in comparison with that of the existing fuel assembly.

Furthermore, in the ninth embodiment, at the positions of four corners of the second position inwardly from the outermost periphery, the gadolinia fuel rods having the enriched gadolinia are disposed. Accordingly, the power at the positions of four corners where the power tends to be high can be reduced, and thereby the uranium enrichment of these fuel rods can be increased. In the short-length gadolinia fuel rods, the power suppression effect due to gadolinia does not appear at the position other than the effective portion in the axial direction. However, since the power distribution in the axial direction is the highest at the lower portion where the effective portion of the short-length fuel rod exists, the aforementioned effect can be fully exhibited.

By increasing the uranium enrichment of the fuel rods disposed at the four corners of the fuel bundle in the second position inwardly from the outermost periphery, the uranium enrichment averaged over the bundle can be increased from the existing value of 3.96 wt % to 3.98 wt % by approximately 0.02 wt %, thereby improving the fuel economy.

Embodiment 10

Figure 13:
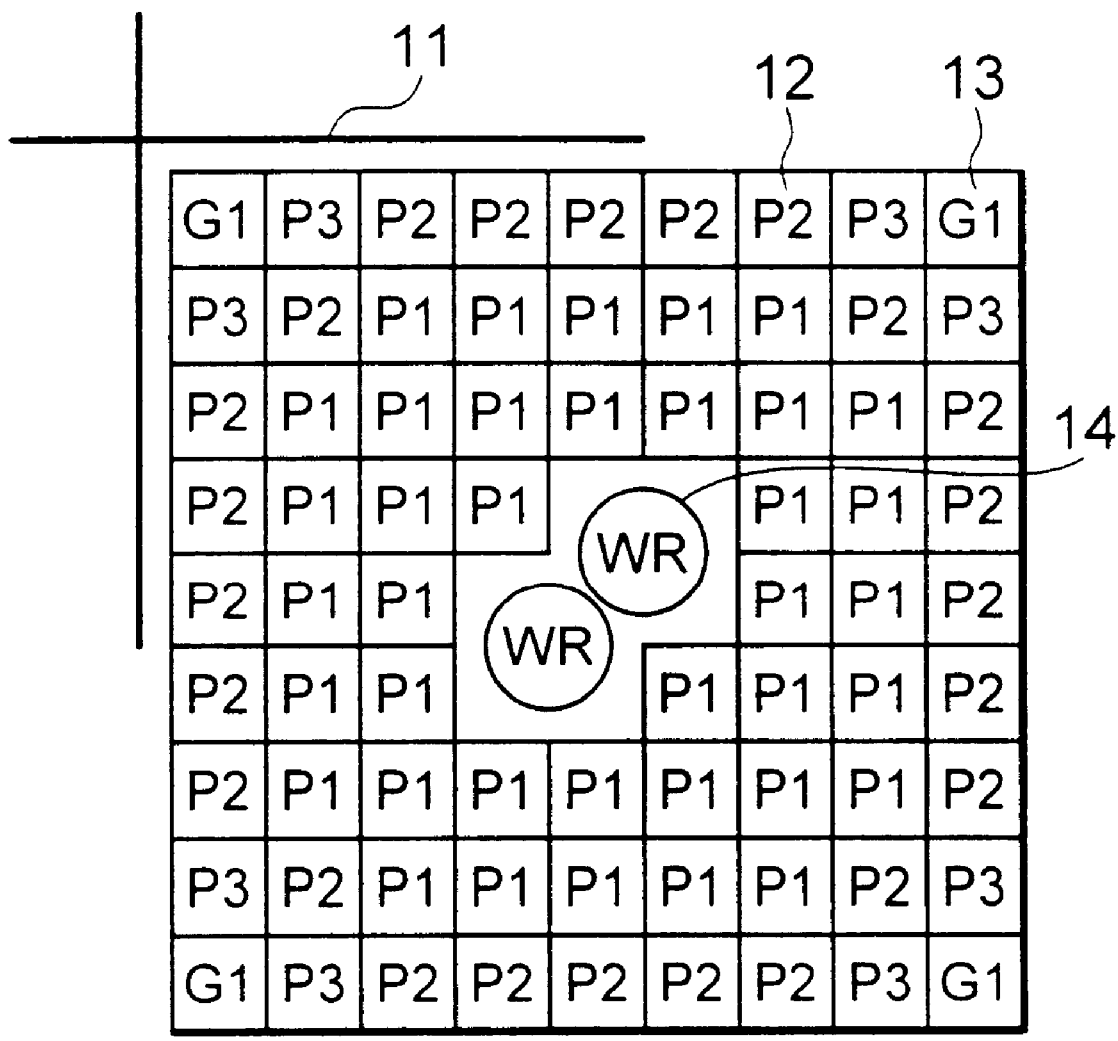
FIG. 13 is a transversal sectional view showing an arrangement of fuel rods in the tenth embodiment of the present invention.

FIG. 13 is, in the tenth embodiment of the fuel assembly of the present invention, a transversal sectional view showing an arrangement of the fuel rods 12 and 13 with the control rod 11 in the upper left position.

In the figure, reference marks P1, P2 and P3 denote fuel rods containing plutonium, respectively, with the added 20 number increasing, plutonium enrichment becomes lower (P1>P2>P3). G1 denotes a gadolinia fuel rod that contain no plutonium and in which uranium is mixed with the oxide of the enriched gadolinium (enriched gadolinia) having the isotopic composition shown in the aforementioned Table 1. WR denotes a water rod 14.

As shown in the figure, in the tenth embodiment, the gadolinia fuel rods G1 containing the enriched gadolinia are disposed in the positions of four corners of the fuel bundle of the outermost periphery. The concentration of the enriched gadolinia in the gadolinia fuel rods G1, in comparison with that of the fuel assembly of the existing design in which the natural gadolinia is used (cf. Japanese Patent Publication (KOKOKU) No. HEI 5-8398), can be largely decreased. Furthermore, the uranium enrichment in the gadolinia fuel rods G1 is 2 wt % far higher than the existing value (0.711 wt %), due to the use of the aforementioned enriched gadolinium the uranium enrichment being largely increased.

Embodiment 11

Figure 14A:
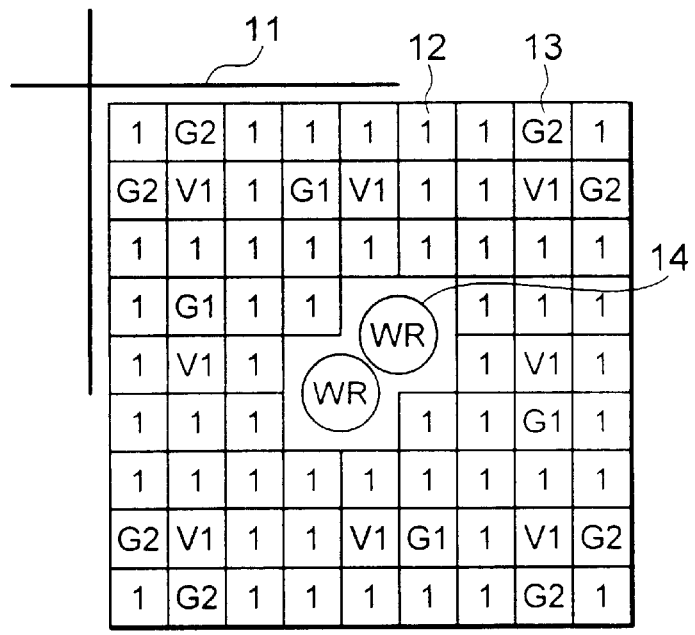
FIG. 14A is a transversal sectional view showing an arrangement of fuel rods in the eleventh embodiment of the present invention, FIG. 14B being a diagram showing enrichment distributions of fissile material and concentration distributions of gadolinia in an axial direction of the fuel rods, in the eleventh embodiment.

FIG. 14A is, in the eleventh embodiment of the fuel assembly of the present invention, a transversal sectional view showing an arrangement of the fuel rods 12 and 13 with the control rod 11 in the upper left position. Reference marks 1 and V1 denote the fuel rod 12 containing no gadolinia, G1 and G2 denoting the gadolinia fuel rod 13. Here, the fuel rods denoted by reference marks G1 and G2 are the long-length fuel rods, the fuel rods denoted by V1 being the short-length fuel rods. WR denotes a water rod 14.

Figure 14B:
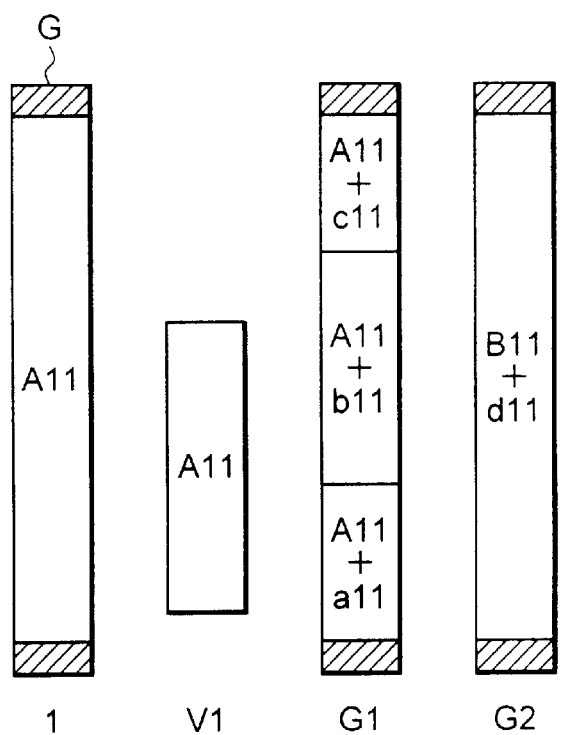

FIG. 14B is a diagram showing the enrichment distributions of uranium in the axial direction of the fuel rods (1, V1, G1, and G2) and the gadolinia concentration distributions. As shown in the figure, the uranium enrichments of A11, B11 and G are employed and these are in the decreasing order of A11>B11>G. G denotes the enrichment of the natural uranium. In the long-length fuel rod, the portions containing the natural uranium alone are disposed at the upper and lower ends, respectively. The gadolinia concentrations of a11 through c11 and d11 are employed and these are in the decreasing order of a11>b11>c11>d11, d11 being one half or less all through c11. Here, whereas a11 through c1 are the concentrations of the natural gadolinia, d11 is the concentration of the oxide of the enriched gadolinium having the isotopic composition shown in the aforementioned Table 1. The gadolinia fuel rod (G1), excluding the upper and lower end portions consisting of the natural uranium, is divided into three segments in the axial direction and the gadolinia concentration in each segment is different from each other.

As shown in the figure, in the eleventh embodiment, all the fuel rods other than the gadolinia fuel rods (G2), the uranium enrichment is one kind of A11. Furthermore, the gadolinia fuel rods (G2) containing the enriched gadolinia are disposed in the positions of coordinates of (1, 2) and (2, 1) and in the positions symmetrical therewith. Thereby, the fuel rods in these positions and in the neighboring outermost periphery corner positions can be suppressed in their power. In the gadolinia fuel rods (G2), due to the enriched gadolinia, there is no necessity of excessively lowering the uranium enrichment, as a result the uranium enrichment being able to set at B11 next highest to A11. Accordingly, due to such design, while suppressing the cost and time in the course of manufacturing fuel pellets as low as possible, the uranium enrichment averaged over the bundle can be heightened.

Embodiment 12

Figures 15A, 15B:
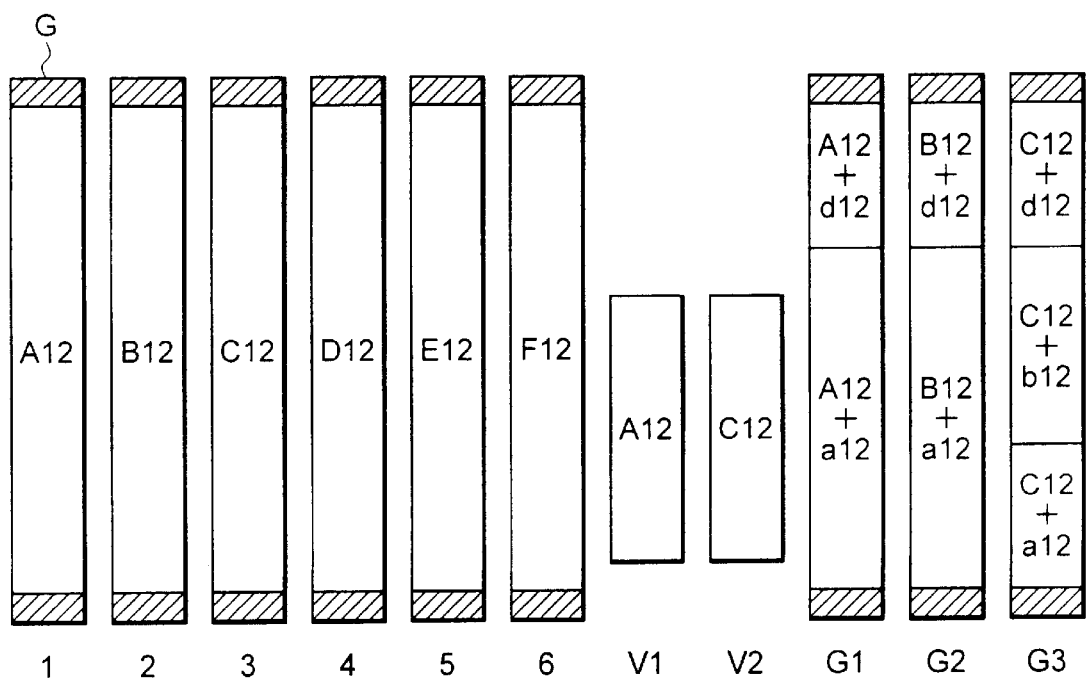
FIG. 15A is a transversal sectional view showing an arrangement of fuel rods in the twelfth embodiment of the present invention, FIG. 15B being a diagram showing enrichment distributions of fissile material and concentration distributions of gadolinia in an axial direction of the fuel rods, in the twelfth embodiment.

FIG. 15A is, in the twelfth embodiment of the fuel assembly of the present invention, a transversal sectional view showing an arrangement of the fuel rods 12 and 13 when the control rod 11 is located in the upper left position. The fuel rods 12 that contain no gadolinia are denoted by reference marks of 1, 2, 3, 4, 5, 6, and V1 and V2 for the respective types, the gadolinia fuel rods 13 being denoted by reference marks G1, G2 and G3. The fuel rods are consisted of the long-length fuel rods shown by reference marks of 1, 2, 3, 4, 5, 6, G1, G2 and G3 and the short-length fuel rods shown by reference marks of V1 and V2. WR denotes a water rod 14.

FIG. 15B is a diagram showing the distributions in the axial direction of the fuel rods (1, 2, 3, 4, 5, 6, V1, V2, G1, G2, and G3) of the uranium enrichment and the gadolinia concentration. As shown in the figure, the uranium enrichments of A12 through F12 and G are used and these are in the decreasing order of A12>B12>C12>D12>E12>F12>G. G denotes the enrichment of the natural uranium. In the long-length fuel rods, the portions containing the natural uranium alone are disposed at the upper and lower ends.

Furthermore, the gadolinia concentrations of a12 through c12 and d12 are used. These are in the decreasing order of a12>b12>c12>d12, d12 being one half or less of a12 through c12. Here, a12 through c12 are the concentrations of the natural gadolinia, d12 being the concentration of the oxide of the enriched gadolinium having the isotopic composition shown in the aforementioned Table 1. Furthermore, the gadolinia fuel rods (G1, G2 and G3), excluding the upper and lower ends having of the natural uranium, are divided into a plurality of segments in the axial direction. There is disposed the difference of the gadolinia concentrations in the respective segments. In the segment just below the upper end portion that has the natural uranium, the enriched gadolinia is added to uranium.

Figure 22A:
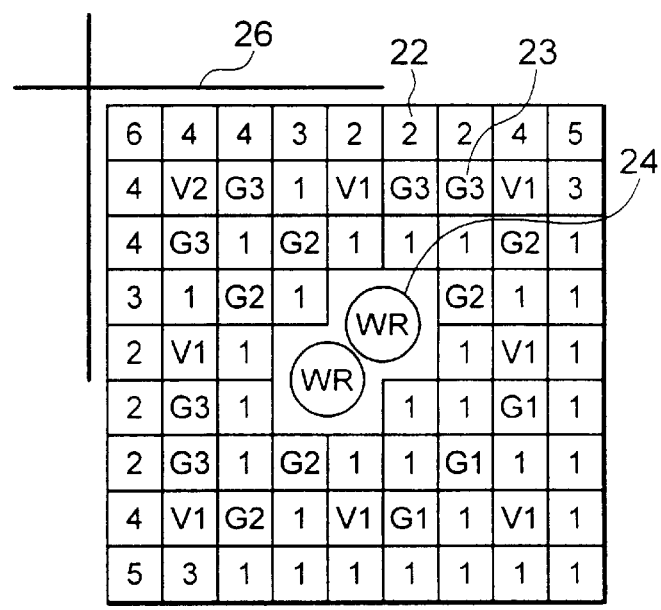
FIG. 22A is a transversal sectional view showing an arrangement of fuel rods in another example of the existing fuel assembly, FIG. 22B being a diagram showing, in an axial direction of the fuel rods, enrichment distributions of fissile material and concentration distributions of gadolinia.
Figure 22B:
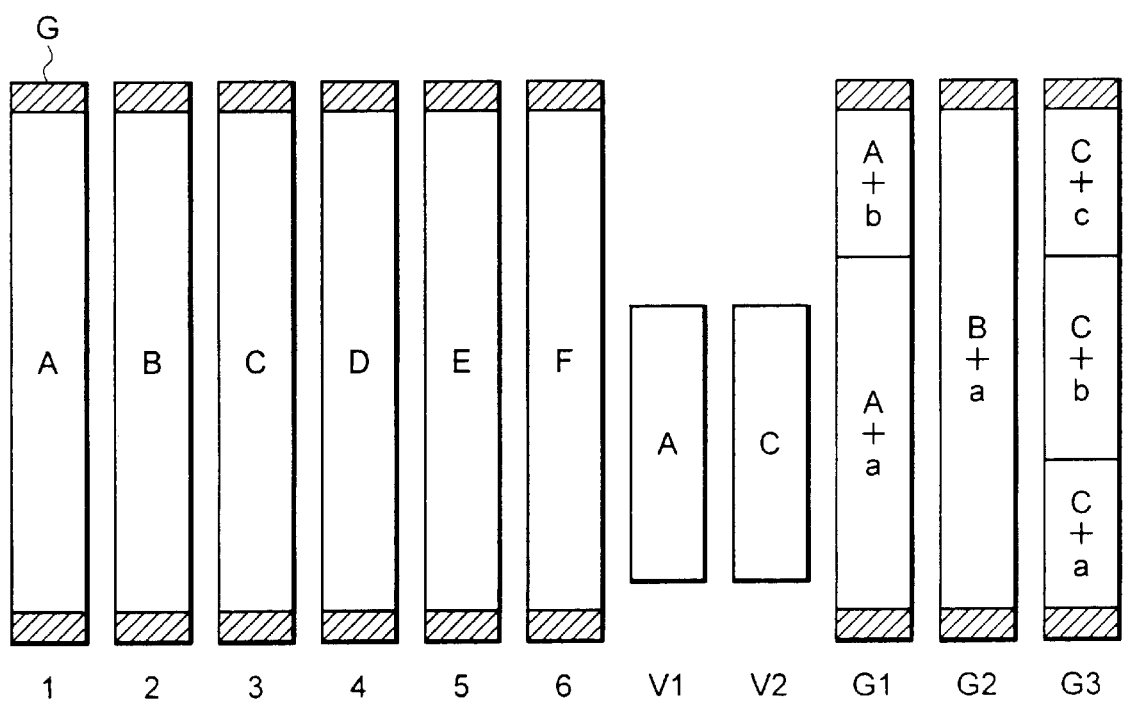

Thus, in the twelfth embodiment, the uranium enrichment distribution is utterly same with that of the existing fuel assembly (cf. FIG. 22). Accordingly, the uranium enrichment averaged over the bundle is same with that of the existing one of 3.96 wt %. However, in the respective gadolinia fuel rods, the enriched gadolinium is used in the upper end portion of which power is low and where residues remain much when the natural gadolinium is used. Accordingly, the reactivity at the cycle end is increased, resulting in an improvement of fuel economy.

Embodiment 13

FIG. 16 is, in the thirteenth embodiment of the fuel assembly of the present invention, a transversal sectional view showing an arrangement of the fuel rods 12 and 13 when the control rod 11 is placed in the upper left position. The fuel rods 12 that contain no gadolinia are denoted by reference marks 1, 2, 3 and 4, the gadolinia fuel rod 13 being denoted by reference mark G1. In the fuel rods 12 that contain no gadolinia, with the number decreasing, the uranium enrichment becomes higher (1>2>3>4). The gadolinia fuel rod G1 contains the oxide of the enriched gadolinium (enriched gadolinia) having the isotopic composition shown in Table 3. WR denotes a water rod 14.

TABLE 3

| Gd isotope | Relative content |
| --- | --- |
| Gd-155 | 20 wt % |
| Gd-157 | 60 wt % |
| Other than the above | 20 wt % |

In the present embodiment, the fuel rods having the highest uranium enrichment are disposed at a part of the fuel bundle of the outermost periphery, for instance at the coordinate positions of (1, 4) and (1, 5). In order to suppress the power of the fuel rods from becoming excessive, in a part of the positions in the second position inwardly from the outermost periphery, for instance in the positions of (2, 3) and (2, 4), two or more of gadolinia fuel rods (G1) are disposed adjacent through a face. The gadolinia fuel rods (G1) contain enriched gadolinium having the isotopic composition of 20 wt % of Gd-155, 60 wt % of Gd-157 and 20 wt % of the other isotopes.

In thus configured thirteenth embodiment, the number of pieces of the gadolinia fuel rod can be suppressed to result in securing thermal margin of the fuel rods. That is, in the existing fuel assembly, when the gadolinia fuel rods are disposed adjacent through a face, the reactivity controllability of gadolinium deteriorates. Accordingly, at the coordinate positions of for instance (4, 4) or the like, several pieces of the gadolinia fuel rod need to be disposed.

As a result, the power of the fuel rods decreases, and the power of the fuel rods other than these rises on the contrary. Thereby, deterioration of power peaking factor of the fuel rods is caused.

However, in the thirteenth embodiment, the enriched gadolinium is used in the gadolinia fuel rods disposed adjacent through a face. As a result, the reactivity controllability is high, and the gadolinia fuel rods need not to be further increased. Accordingly, without making the power peaking factor excessively large, thermal margin of the fuel rods can be secured.

Embodiment 14

FIG. 17 is, in the fourteenth embodiment of the fuel assembly of the present invention, a transversal sectional view showing an arrangement of the fuel rods 12 and 13 with the control rod disposed in the upper left position. The fuel rods comprise two kinds of different diameters. In the figure, reference marks 1, 2, 3 and 4 denote the fuel rods 12 that contain no gadolinia and reference marks G1 and G2 denote the gadolinia fuel rods 13, respectively. The reference marks with circle denote the fuel rods of small-sized diameter. In the fuel rods 12 containing no gadolinia, with the number decreasing, the uranium enrichment becomes higher (1>2>3>4). For the uranium enrichment of the gadolinia fuel rods 13, it is preferable that the uranium enrichment is the same in G1 and G2, or the uranium enrichment of G1 is made larger than that of G2.

The gadolinia fuel rods (G1) contain the natural gadolinia and the gadolinia fuel rods (G2) of small-sized diameter contain the oxide of the enriched gadolinium (enriched gadolinia) having the isotopic composition shown in the aforementioned Table 1. The gadolinia concentration in the gadolinia fuel rods (G2) having the enriched gadolinia is smaller (½ or less) than that of the gadolinia fuel rods (G1) having the natural gadolinia. WR denotes a water rod 14.

Since in the fourteenth embodiment thus configured two kinds of fuel rods of different diameter are disposed alternatively, uranium more than in the existing fuel assembly can be loaded. Furthermore, since the gadolinia fuel rods (G2) of small-sized diameter contain the enriched gadolinia, there is no need of increasing a gadolinia addition amount, and thermal margin of the gadolinia fuel rod is secured.

Embodiment 15

Figure 18:
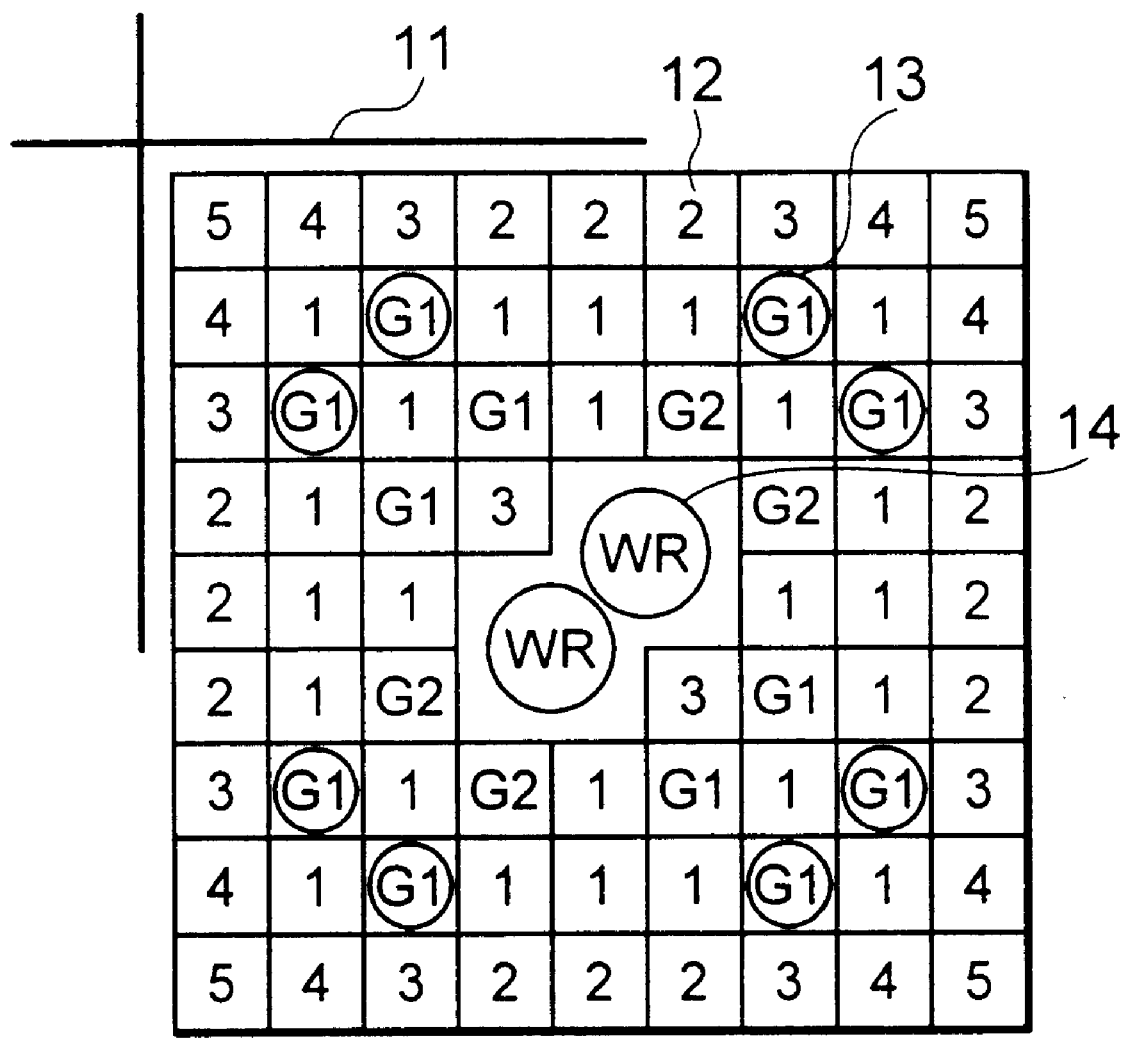
FIG. 18 is a transversal sectional view showing an arrangement of fuel rods in the fifteenth embodiment of the present invention.
Figure 19:
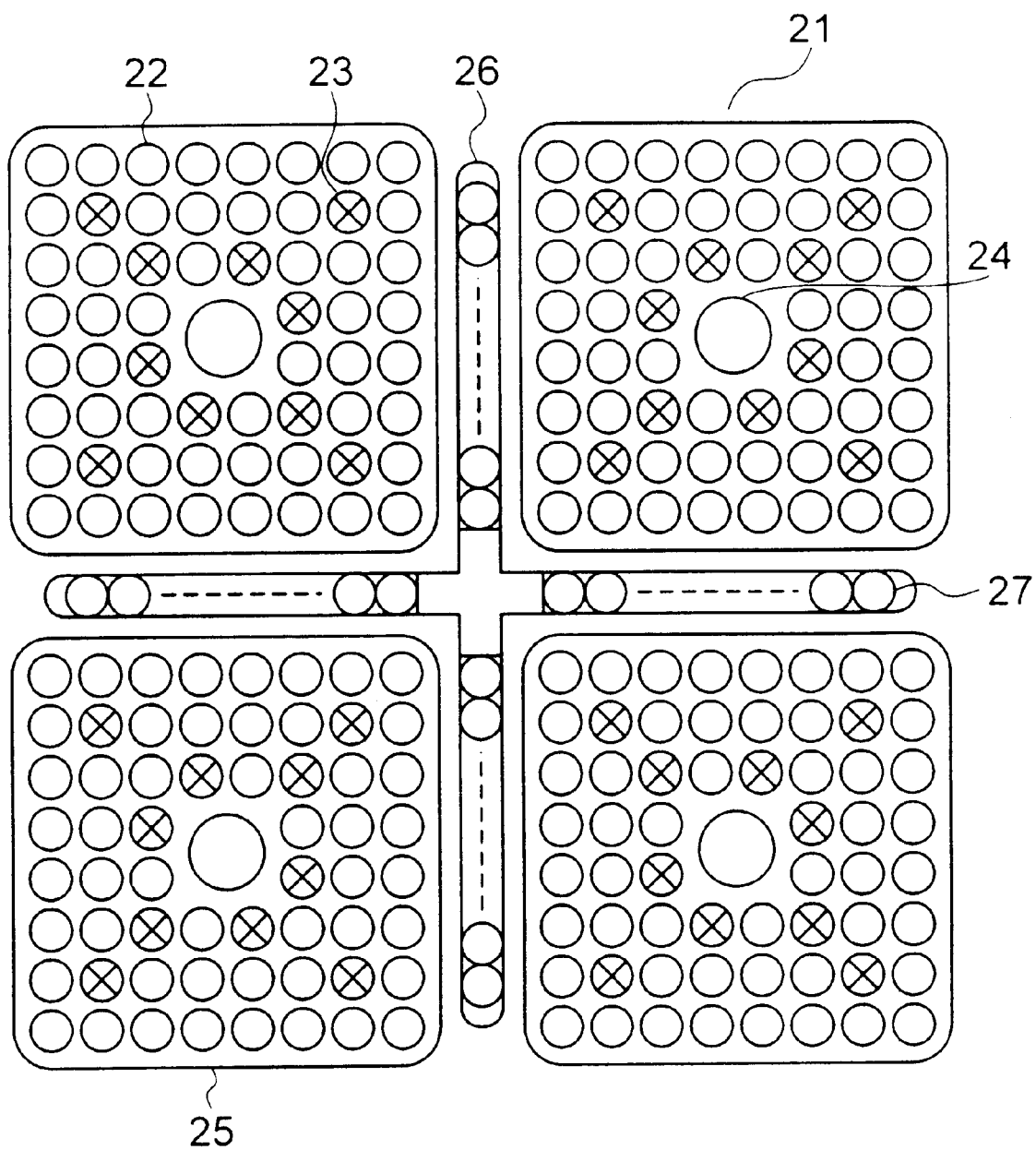
FIG. 19 is a transversal sectional view showing a structure of the existing fuel assembly.
Figure 20:
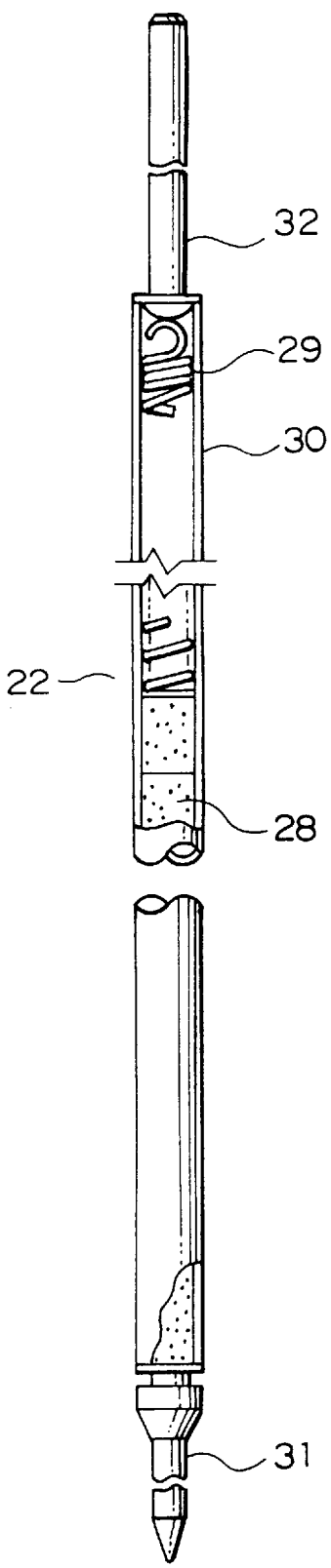
FIG. 20 is a sectional view in an axial direction showing a structure of a fuel rod in the existing fuel assembly.
Figure 21A:
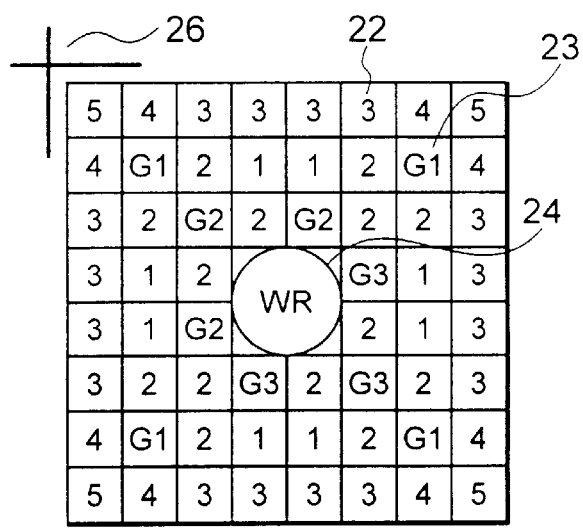
FIG. 21A is a transversal sectional view showing an arrangement of fuel rods in one example of the existing fuel assembly, FIG. 21B being a diagram showing enrichment distributions of fissile material and concentration distributions of gadolinia, in an axial direction of the fuel rods.
Figure 21B:
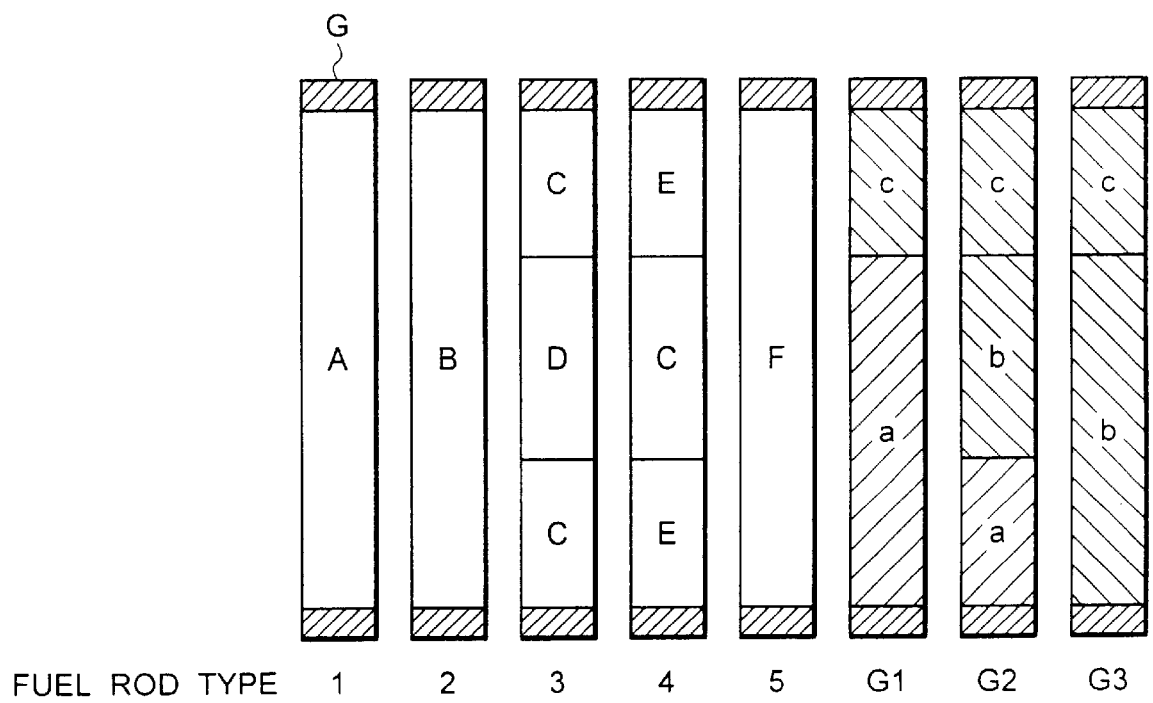

FIG. 18 is, in the fifteenth embodiment of the fuel rods of the present invention, a transversal sectional view showing an arrangement of the fuel rods 12 and 13 with the control rod 11 disposed in the upper left position. In the figure, reference marks 1, 2, 3, 4 and 5 denote the fuel rods that contain no gadolinia and reference marks G1 and G2 denote the gadolinia fuel rods 13. The gadolinia fuel rods 13 comprise two kinds of different diameters. Ones with circled marks denote the fuel rods of small-sized diameter. In the fuel rods 12 that contain no gadolinia, with the number decreasing, the uranium enrichment is higher (1>2>3>4>5).

Both the gadolinia fuel rods (G1 and G2) contain the oxide (enriched gadolinia) of the enriched gadolinium having the isotopic composition shown in the aforementioned Table 1. The concentration of the enriched gadolinia is same in all gadolinia fuel rods (G1 and G2) and is smaller (½ or less) than that of an existing gadolinia fuel rod containing the natural gadolinia. For the uranium enrichment of the gadolinia fuel rods 13, it is preferable that the uranium enrichment is the same in G1 and G2, or the uranium enrichment of G1 is made larger than that of G2. WR denotes a water rod 14.

In the fuel assembly of the present embodiment, due to the difference of the diameters of the gadolinia fuel rods, the specific burnup at which gadolinia burns out is different from rod to rod. In specific, the fuel rod of small-sized diameter burns out earlier. Furthermore, since the positions are high in power, the difference of the specific burnup at which the rods burn out becomes more conspicuous. Accordingly, in the fifteenth embodiment, the peak value of the infinite multiplication factor when considered over the entire fuel assembly becomes smaller and the infinite multiplication factor varies moderately. The problems such as deterioration of shut-down margin and an increase of channel peaking can be solved.

In the aforementioned eighth through fifteenth embodiments, the explanations are given with the fuel assembly of square grid pattern of nine-columns/nine-rows as an example. However, the present invention is similarly effective in the arrangement other than the above, in particular in a fuel assembly having the number of arrangement larger than nine columns/nine rows. Whereas the explanations are given of the fuel assembly in which only the gadolinia fuel rods having the enriched gadolinium are used, a part of the gadolinia fuel rods may be replaced by ones that have only the natural gadolinium.

Furthermore, a nuclear reactor can be configured by loading the fuel assembly having the enriched gadolinium set forth in the first through fifteenth embodiments and the fuel assembly having the natural gadolinium.

In such nuclear reactor, the gadolinia concentration averaged over the fuel assembly having the natural gadolinium is preferable to be larger than that of the fuel assembly having the enriched gadolinium.

When the fuel assembly having the enriched gadolinium and the fuel assembly having the natural gadolinium alone are mingled, the fuel assembly containing the enriched gadolinia has the reactivity of the residual gadolinium can be reduced more. After the specific burnup at which gadolinia burns out, namely at the point of time after the second cycle where the fuel is loaded, the infinite multiplication factor of the fuel assembly having the enriched gadolinium becomes larger than that of the fuel assembly having the natural gadolinium only.

In general, in a nuclear reactor, due to leakage neutrons, the outer side tends to deteriorate in the power more than the inner side does. However, when the fuel assembly having the enriched gadolinium is disposed for instance at the outer side of the core, the power of the outer side of the core can be increased. Thereby, the output of the nuclear reactor can be flattened. Accordingly, thermal safety of the nuclear reactor can be improved.

As obvious from the above explanations, according to the present invention, the residual reactivity of gadolinia can be reduced and at the same time thermal performance of the fuel can be improved. Furthermore, without damaging thermal margin of the gadolinia fuel rod, the enrichment of the fissile material averaged over the bundle can be increased and fuel economy can be improved.

While in the foregoing specification, this invention has been described in relation to certain preferred embodiments thereof, and many details have been set forth for purpose of illustration, it will be apparent to those skilled in the art that the invention susceptible to additional embodiments and that certain of the details described herein can be varied considerably without departing from the basic principles of the invention.

What is claimed is:

1. A fuel assembly, comprising a plurality of fuel rods bundled in grid pattern, a part of the fuel rods containing gadolinium as a burnable poison, wherein at least one of the fuel rods that contain gadolinium comprises gadolinium-155 and gadolinium-157, wherein in the fuel rods that contain gadolinium-155 and gadolinium-157, gadolinium-157 is enriched and is present in an amount more than its isotopic abundance in natural gadolinium, and a ratio of said gadolinium-155 to said gadolinium-157 is 0.1 or less.

2. A fuel assembly, comprising a plurality of fuel rods bundled in grid pattern and containing enriched uranium as a nuclear fuel material, a part of the fuel rods containing gadolinium as a burnable poison, wherein at least one of the fuel rods that contain gadolinium comprises gadolinium-155 and gadolinium-157, wherein in the fuel rods that contain gadolinium-155 and gadolinium-157, gadolinium-157 is enriched and is present in an amount more than its isotopic abundance in natural gadolinium, and a ratio of said gadolinium-155 to said gadolinium-157 is 0.1 or less, and wherein an average concentration (wt %) G0 of an oxide of the gadolinium-155 and an oxide of gadolinium-157 averaged over an entire fuel rod having the gadolinium is set in the range shown by the following expression:

$$G0 < 0.25 \cdot P \cdot M / W$$

wherein in the expression, M denotes a number of month under rated power operation per one cycle of an equilibrium reactor core, P power density of a nuclear reactor (kw/l unit), W a sum of isotopic composition (% unit) of gadolinium-155 and gadolinium-157.

3. A nuclear reactor loaded with the fuel assembly set forth in claim 1 and a fuel assembly having natural gadolinium, respectively, wherein a gadolinia concentration averaged over the fuel assembly having natural gadolinium is larger than that of the fuel assembly set forth in claim 1.

4. A nuclear reactor loaded with the fuel assembly set forth in claim 2 and a fuel assembly having natural gadolinium, respectively, wherein a gadolinia concentration averaged over the fuel assembly having natural gadolinium is larger than that of the fuel assembly set forth in claim 2.

* * * * *

UNITED STATES PATENT AND TRADEMARK OFFICE
CERTIFICATE OF CORRECTION

PATENT NO.    : 6,445,759 B1
DATED         : September 3, 2002
INVENTOR(S)   : Kouji Hiraiwa et al.

It is certified that error appears in the above-identified patent and that said Letters Patent is hereby corrected as shown below:

Column 3,
Line 67, "end,." should read -- end. --.

Column 10,
Line 22, "more." should read -- more --.

Column 13,
Line 50, "p1" should read -- 1 --.
Line 63, "5" should read -- 5, --.

Column 19,
Line 40, "different." should read -- different --.

Column 20,
Line 4, "be" should read -- the --.
Line 5, "he" should read -- the --.
Line 43, "outer most" should read -- outermost --.

Column 21,
Line 13, "with the added 20 number" should read -- with the added number --.
Line 54, "all" should read -- a11 --.
Line 55, "c1" should read -- c11 --.

Signed and Sealed this

Thirtieth Day of September, 2003

JAMES E. ROGAN
*Director of the United States Patent and Trademark Office*